(12) United States Patent
Hasebe et al.

(10) Patent No.: US 7,712,769 B2
(45) Date of Patent: May 11, 2010

(54) AIRBAG DEVICE

(75) Inventors: Masahiro Hasebe, Tokyo (JP);
Yukitoshi Narimoto, Tokyo (JP)

(73) Assignee: Takata Corporation, Tokyo (JP)

( * ) Notice: Subject to any disclaimer, the term of this patent is extended or adjusted under 35 U.S.C. 154(b) by 624 days.

(21) Appl. No.: 11/520,435

(22) Filed: Sep. 13, 2006

(65) Prior Publication Data

US 2008/0061536 A1    Mar. 13, 2008

(51) Int. Cl.
*B60R 21/16*    (2006.01)

(52) U.S. Cl. .................. 280/729; 280/743.1; 280/743.2

(58) Field of Classification Search ................. 280/729, 280/743.1, 743.2
See application file for complete search history.

(56) References Cited

U.S. PATENT DOCUMENTS

| | | | |
|---|---|---|---|
| 5,022,675 A | | 6/1991 | Zelenak, Jr. et al. |
| 5,221,108 A | | 6/1993 | Hirabayashi |
| 5,765,867 A | * | 6/1998 | French ..................... 280/743.2 |
| 5,865,466 A | * | 2/1999 | Yamamoto et al. ....... 280/743.1 |
| 6,070,904 A | * | 6/2000 | Ozaki et al. .............. 280/743.1 |
| 6,099,026 A | | 8/2000 | Ando et al. |
| 6,206,409 B1 | | 3/2001 | Kato et al. |
| 6,378,898 B1 | | 4/2002 | Lewis et al. |
| 6,565,118 B2 | | 5/2003 | Bakhsh et al. |
| 6,585,292 B2 | * | 7/2003 | Abe et al. ................. 280/743.1 |
| 6,682,093 B2 | | 1/2004 | Tajima et al. |
| 6,802,534 B2 | | 10/2004 | Neupert |
| 6,834,886 B2 | | 12/2004 | Hasebe et al. |
| 6,913,283 B2 | | 7/2005 | Heym |
| 7,000,943 B2 | | 2/2006 | Hasebe et al. |
| 7,125,037 B2 | * | 10/2006 | Tallerico et al. .......... 280/728.2 |
| 7,125,043 B2 | | 10/2006 | Amamori |
| 7,172,048 B2 | | 2/2007 | Hamada et al. |
| 7,314,228 B2 | | 1/2008 | Ishiguro et al. |
| 7,322,596 B2 | * | 1/2008 | Nakazawa et al. ....... 280/728.2 |
| 7,357,408 B2 | | 4/2008 | Hall et al. |
| 7,370,880 B2 | * | 5/2008 | Hasebe ....................... 280/729 |

(Continued)

FOREIGN PATENT DOCUMENTS

EP    1 338 482 A1    8/2003

(Continued)

OTHER PUBLICATIONS

A search report dated Nov. 23, 2006 from the European Patent Office for corresponding European Application No. 06013374.1-1523.

*Primary Examiner*—Toan C To
(74) *Attorney, Agent, or Firm*—Fitch, Even, Tabin & Flannery

(57) ABSTRACT

An airbag device is provided in which the airbag is made by folding an airbag having a left airbag section and a right airbag section and wrapping the folded airbag by a shape-retaining sheet. In one form, an airbag includes a left airbag section and a right airbag section that are inflated on the left and right, respectively, in front of a passenger, and a base chamber that communicates base ends of the airbag sections with each other. The airbag is folded so as to have reduced vertical and longitudinal widths, and is wrapped by a shape-retaining sheet. An opening is provided in the shape-retaining sheet so as to face a lateral face of a folded body of the airbag on the passenger side.

17 Claims, 22 Drawing Sheets

U.S. PATENT DOCUMENTS

| | | | |
|---|---|---|---|
| 2003/0218325 A1* | 11/2003 | Hasebe et al. | 280/743.2 |
| 2003/0230883 A1* | 12/2003 | Heym | 280/743.1 |
| 2004/0160048 A1 | 8/2004 | Hasebe et al. | |
| 2004/0195807 A1* | 10/2004 | Hasebe et al. | 280/728.1 |
| 2005/0212275 A1 | 9/2005 | Hasebe | |
| 2006/0028009 A1 | 2/2006 | Hasebe et al. | |
| 2006/0290112 A1 | 12/2006 | Hasebe et al. | |
| 2007/0018436 A1 | 1/2007 | Hasebe et al. | |
| 2007/0018437 A1 | 1/2007 | Hasebe et al. | |
| 2007/0018438 A1 | 1/2007 | Hasebe et al. | |
| 2007/0024032 A1 | 2/2007 | Hasebe | |

FOREIGN PATENT DOCUMENTS

| | | |
|---|---|---|
| EP | 1 364 838 A2 | 11/2003 |
| EP | 1 452 403 A1 | 9/2004 |
| EP | 1 580 083 A2 | 9/2005 |
| JP | 10-71911 | 3/1998 |
| JP | 2005082021 | 3/2005 |

* cited by examiner

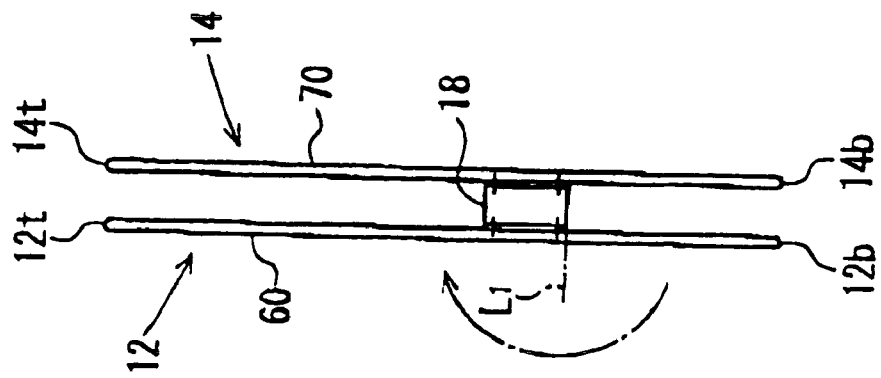
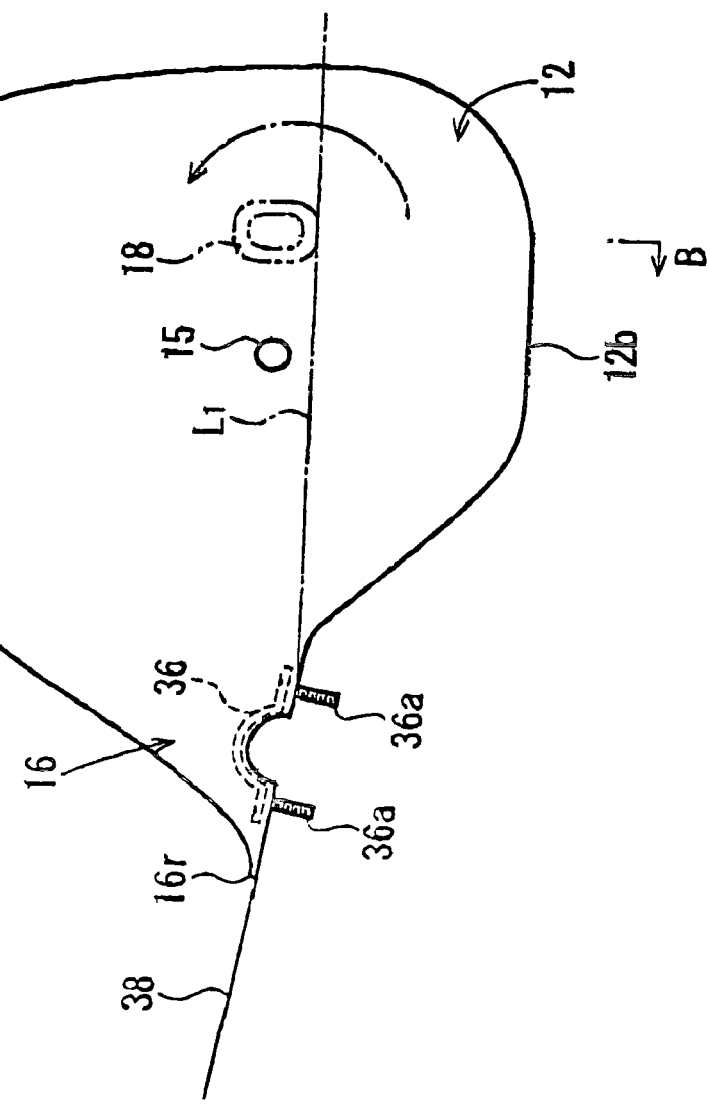

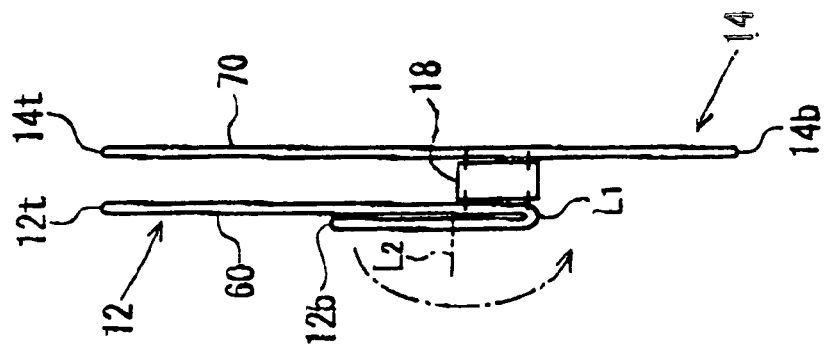
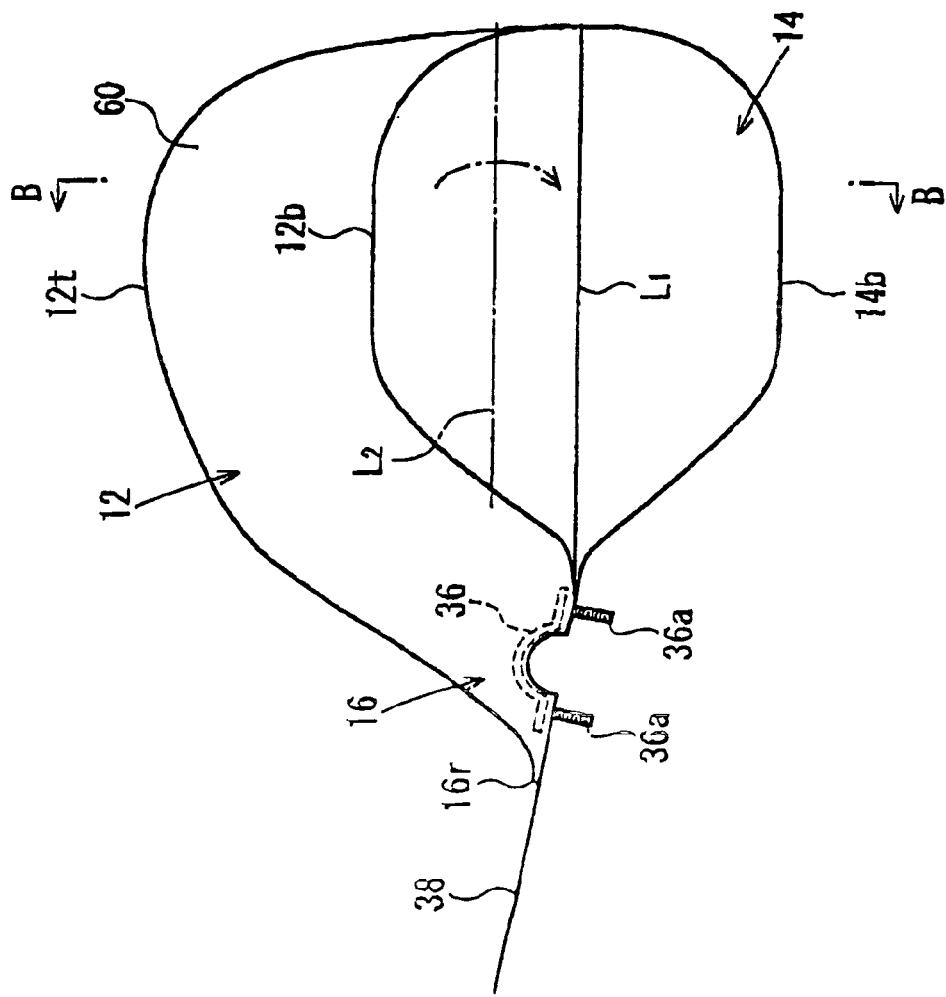
FIG. 7A
FIG. 7B

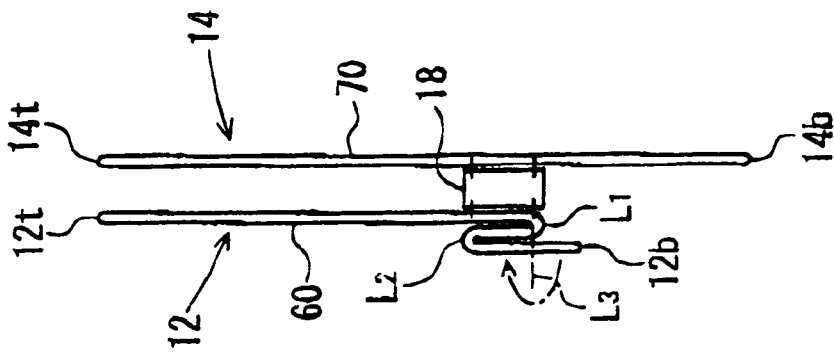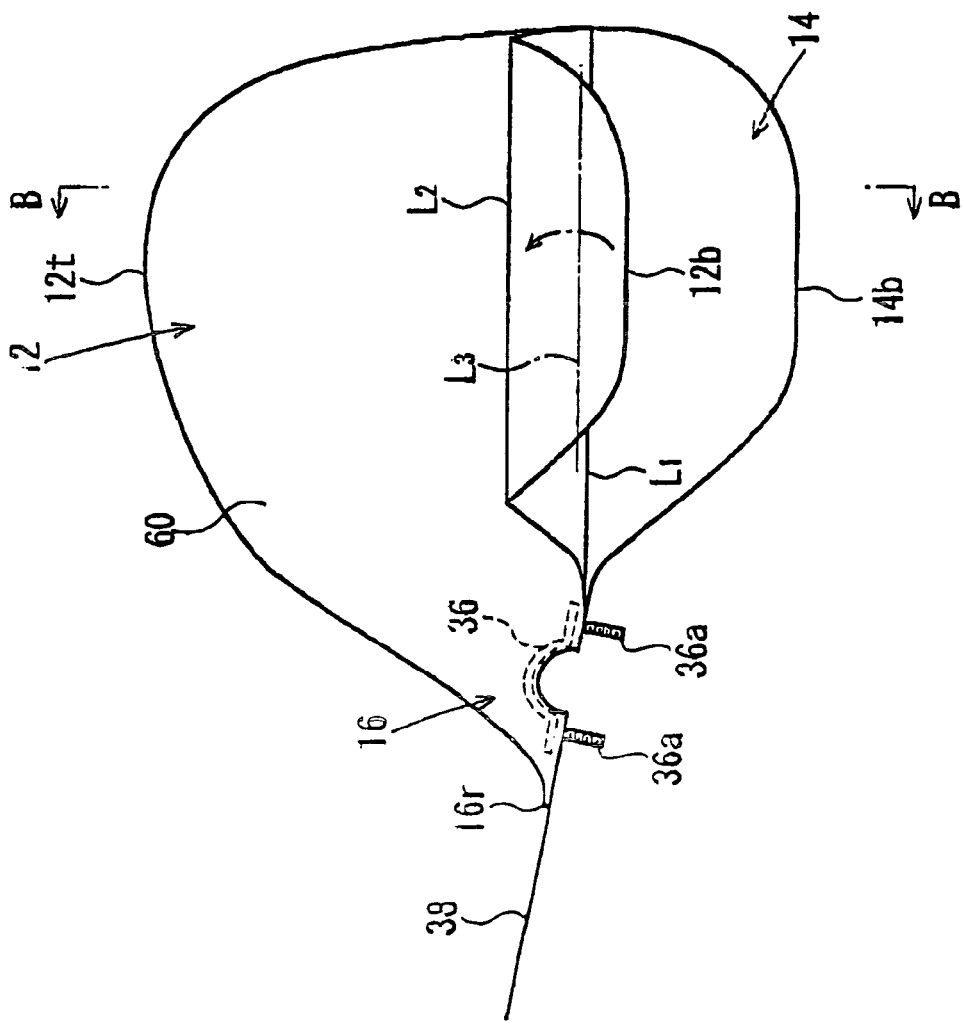

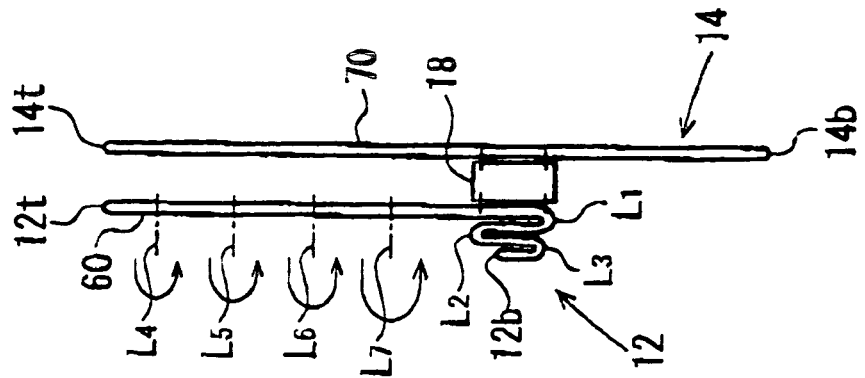
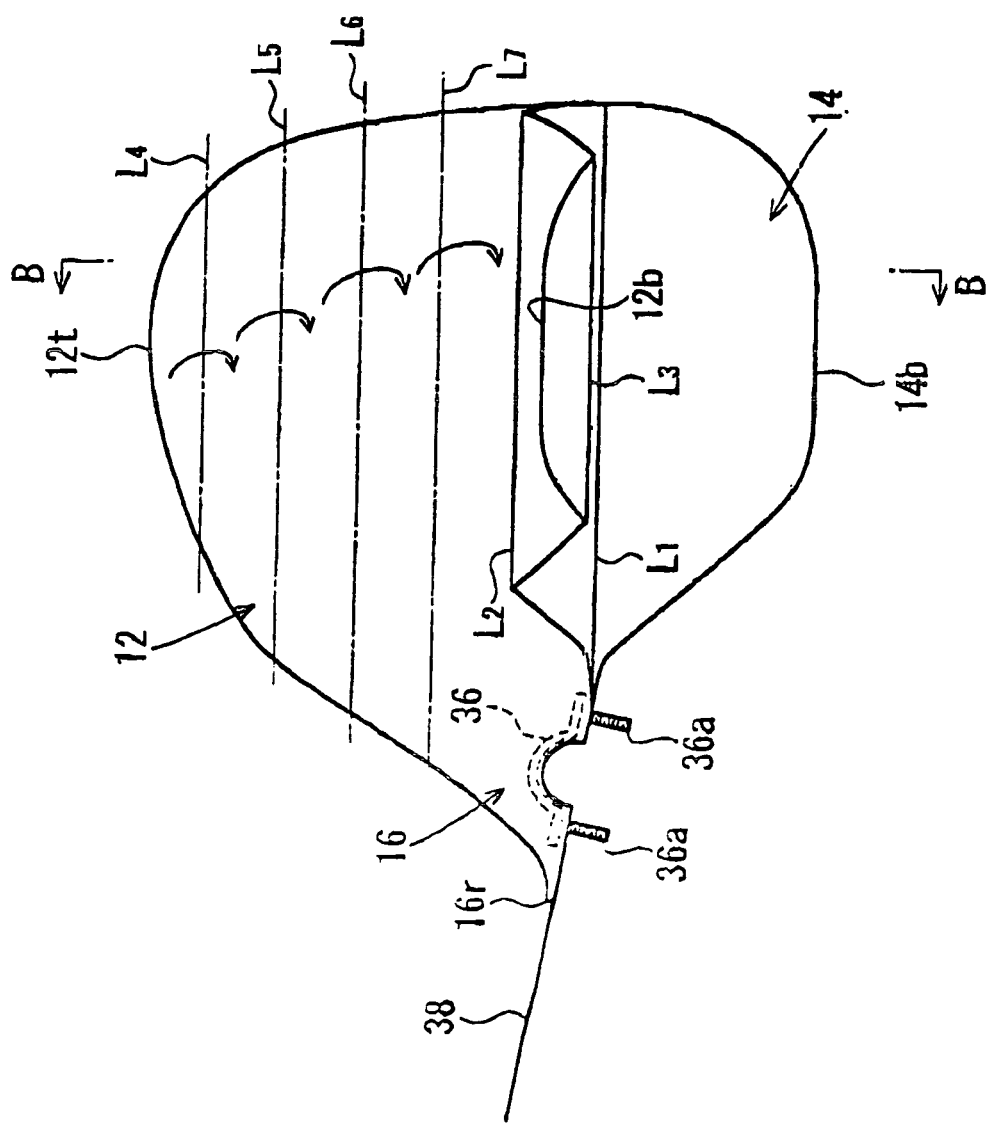

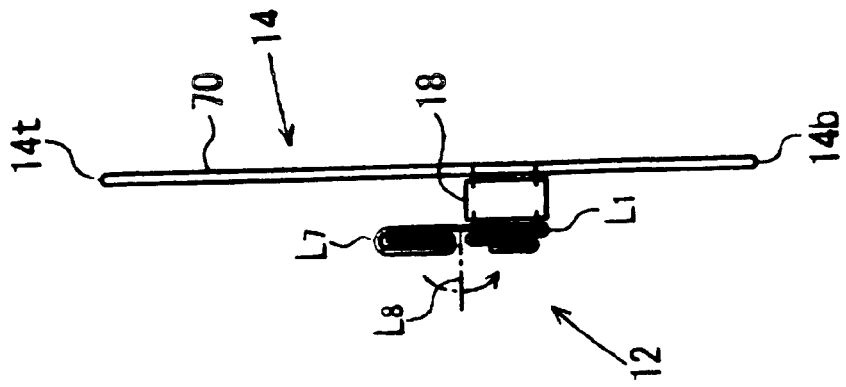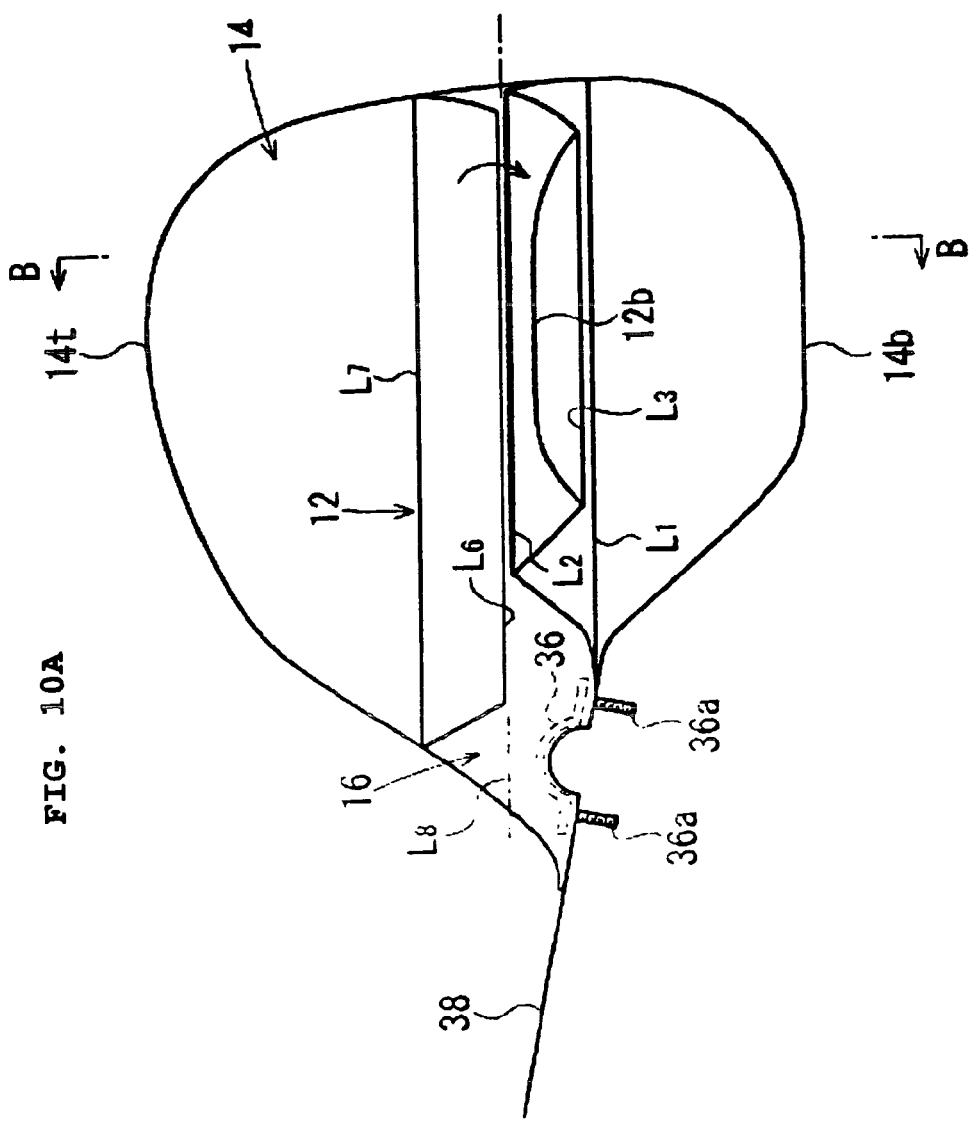

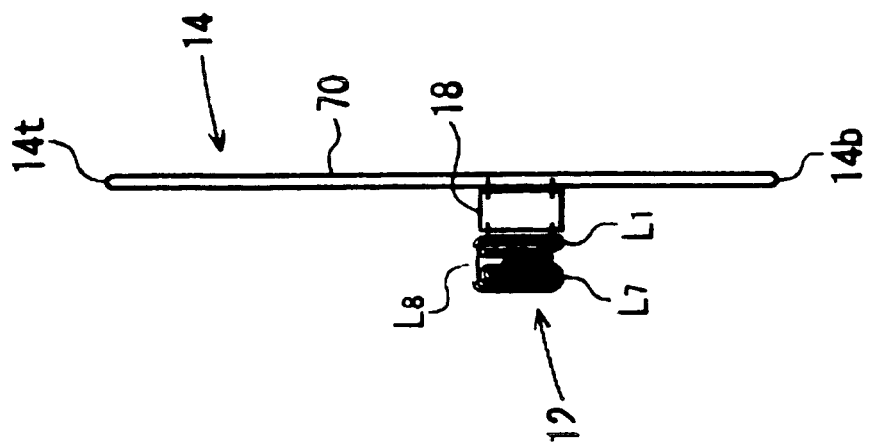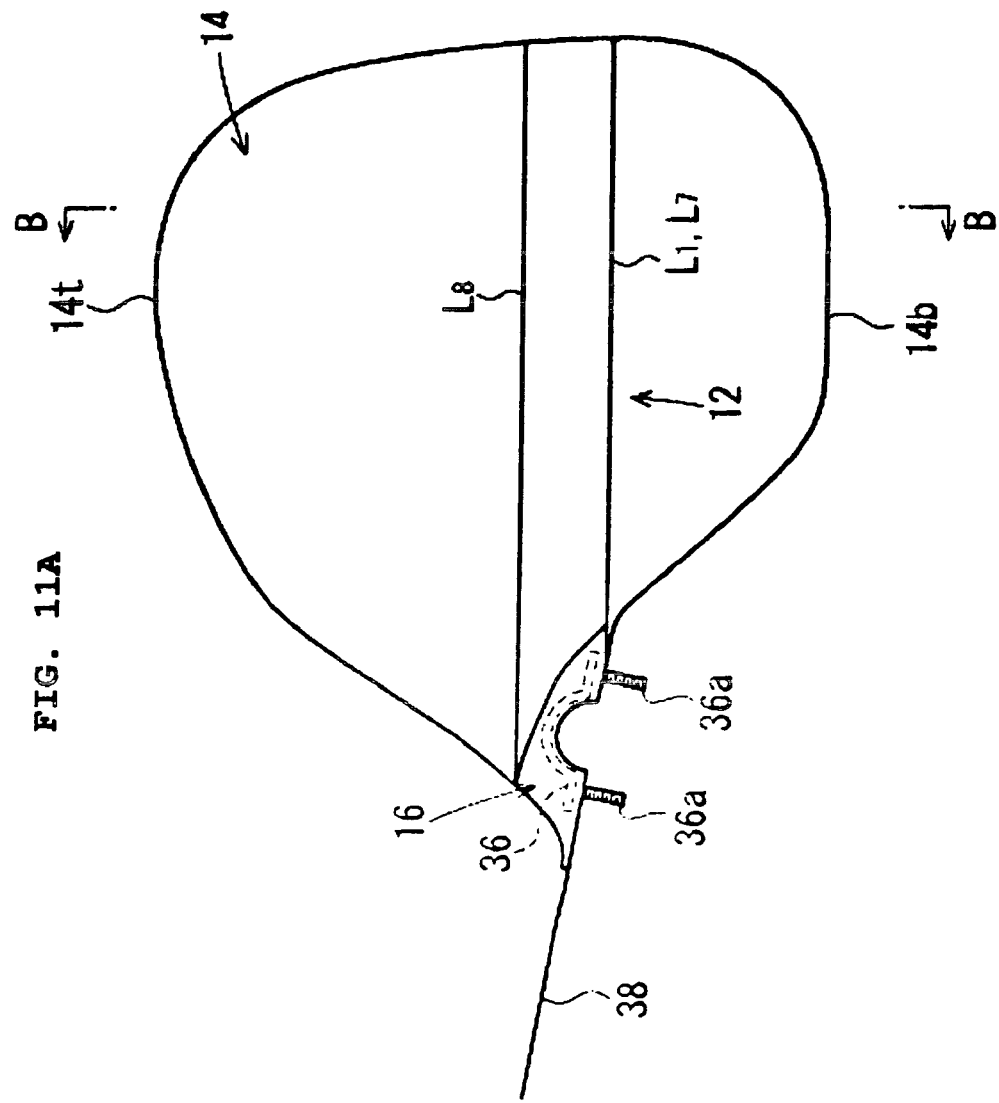

AIRBAG DEVICE

FIELD OF THE INVENTION

The present invention relates to an airbag device including an airbag that is inflated at the time of a vehicle collision to receive a passenger, and more specifically, it relates to an airbag device including an airbag having a left airbag section and a right airbag section that are inflated on the right and left, respectively, in front of a passenger.

BACKGROUND OF THE INVENTION

Japanese Unexamined Patent Application Publication No. 2004-268903 discloses an airbag for receiving a passenger at the time of a vehicle collision and a folding method thereof in which the airbag has a left airbag section and a right airbag section that are inflated on the right and left, respectively, in front of a passenger and is adapted to be inflated by an inflator common to the airbag sections. In the airbag disclosed in the publication, the left airbag section and the right airbag section are not connected to each other, and middle portions of the airbag sections in the fore-and-aft direction thereof are connected by a connecting part.

In the above publication, portions of the airbag sections closer to their leading ends than the connecting part are folded along vertical folding lines, respectively, so as to be primary folded bodies, and then, the primary folded bodies are folded to be smaller.

This airbag is folded and accommodated within a case and covered with a cover. When the inflator (gas generator) begins to discharge gas at the time of a vehicle collision, the airbag is inflated toward the front of a passenger while pushing the cover open.

SUMMARY OF THE INVENTION

Accordingly, the object of the present invention is to provide an airbag device made by folding an airbag having a left airbag section and a right airbag section and wrapping the folded airbag by a shape-retaining sheet.

An airbag device according to a first form of the invention includes a folded airbag, a case accommodating the airbag, and an inflator for inflating the airbag. The airbag on a leading-end side is inflated in a direction away from a base-end side of the airbag by gas discharged from the inflator disposed on the base-end side. The airbag includes a base end part having a gas introducing port that receives gas from the inflator, a left airbag section that is connected to the base end part and inflated on the left in front of a passenger, and a right airbag section that is connected to the base end part and inflated on the right in front of the passenger. The folded airbag is wrapped by a shape-retaining sheet.

The airbag device according to a second form is an airbag device according to the first form in which the shape-retaining sheet is provided with an opening for allowing the folded airbag to be observed.

The airbag device according to a third form is an airbag device according to the second form in which the airbag is made by primarily folding the left airbag section and the right airbag section to form primary folded bodies that are elongated in forward and rearward directions, then secondarily folding the primary folded bodies so as to have a reduced longitudinal width to form the secondary folded body, and thereafter folding the base end part. The opening is provided in a position where it overlaps at least one of the lateral face of the secondary folded body on the passenger side and the lateral face of the secondary folded body on the opposite side to the passenger.

The airbag device according to a fourth form is an airbag device according to the third form in which a portion of the base end part closer to the passenger is pulled out farther than the secondary folded body and folded, in which a portion of the lateral face of the secondary folded body in the lateral face of the folded airbag is covered by the pulled-out portion of the base end part, and the opening is provided in a position where it faces both the pulled-out portion of the base end part and the lateral face of the secondary folded body that are not covered by the base end part.

In the airbag device according to the invention, when the inflator operates to inflate the airbag, the gas from the inflator is introduced into the base end part of the airbag through the gas introducing port to inflate the base end part first. Next, the gas is introduced into the left airbag section and the right airbag section to inflate them. The inflated left airbag section receives the left chest of a passenger and the inflated right airbag section receives the right chest of the passenger. Hard and strong ribs exist in the left and right chests. The airbag receives and absorbs an impact on the passenger through the ribs.

Further, in the invention, in a state in which the airbag is inflated, if the spacing between the front most ends of the left airbag section and the right airbag section is 150 to 450 mm, the inflated left airbag section directly faces a central region of the left chest, and the inflated right airbag section directly faces a central region of the right chest. As a result, the region of the ribs of the upper half of the passenger's body is reliably and securely received by the airbag.

In the present invention, since the folded airbag is wrapped by a shape-retaining sheet, the folded shape of the airbag is maintained. Therefore, when the folded body of the airbag is accommodated within the case, the work can be efficiently performed.

Also, any slip between the folded body of the airbag accommodated within the case and the inner face of the case, the instrument panel, or a lid is eliminated or suppressed.

According to the second form of the airbag device, the folded state of the folded body of the airbag can be observed with eyes or fingers through the opening provided in the shape-retaining sheet.

According to the third form of the airbag device, the airbag is made by primarily folding the left airbag section and the right airbag section to form primary folded bodies that are elongated in forward and rearward directions, by secondarily folding the primary folded bodies so as to have a reduced longitudinal width to form a secondary folded body, and then by folding the base end part.

The opening is provided in a position where it faces the lateral face of the folded body of the airbag. As a result, the folded state of the airbag formed on the lateral face can be observed.

As defined in the fourth form of the invention, if the opening is provided in a position where it faces both the secondary folded body and the base end part overlapped with the lateral face of the secondary folded body, the folded state of both the secondary folded body and the base end part can be observed.

BRIEF DESCRIPTION OF THE DRAWINGS

FIGS. 6(a) and 6(b) are explanatory views showing the process of folding the airbag in FIG. 1.

FIGS. 7(a) and 7(b) are explanatory views showing the process of folding the airbag in FIG. 1.

FIGS. 8(a) and 8(b) are explanatory views showing the process of folding the airbag in FIG. 1.

FIGS. 9(a) and 9(b) are explanatory views showing the process of folding the airbag in FIG. 1.

FIGS. 10(a) and 10(b) are explanatory views showing the process of folding the airbag in FIG. 1.

FIGS. 11(a) and 11(b) are explanatory views showing the process of folding the airbag in FIG. 1.

DETAILED DESCRIPTION OF THE PREFERRED EMBODIMENTS

Hereinafter, an embodiment of the invention will be described with reference to the accompanying drawings.

Figure 1:
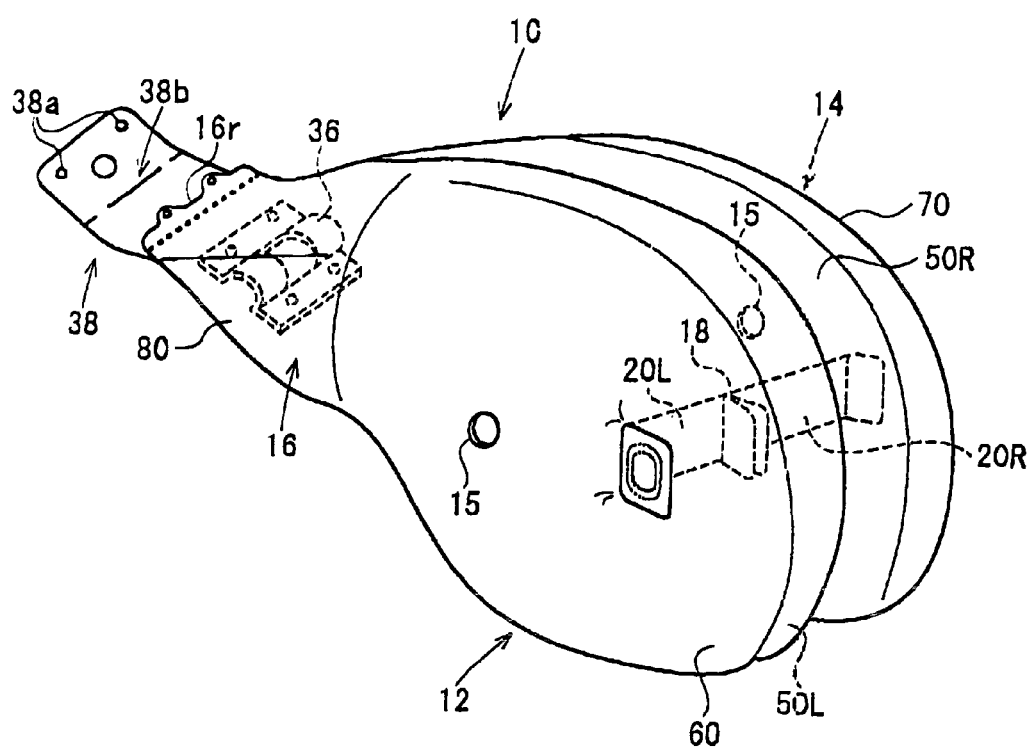
FIG. 1 is a perspective view of an airbag according to an embodiment of the invention.
Figure 2:
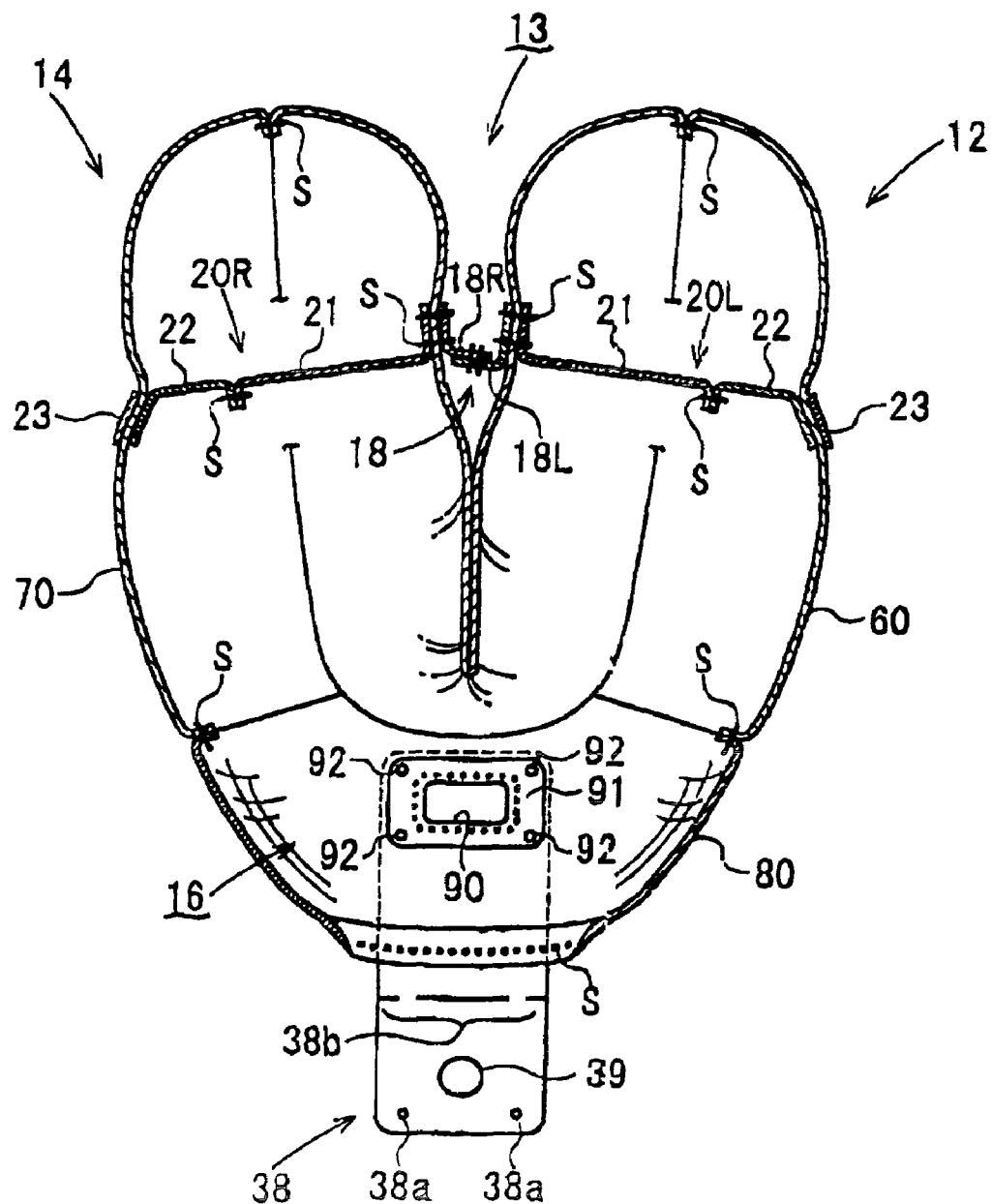
FIG. 2 is a horizontal sectional view of the airbag in FIG. 1.
Figure 3:
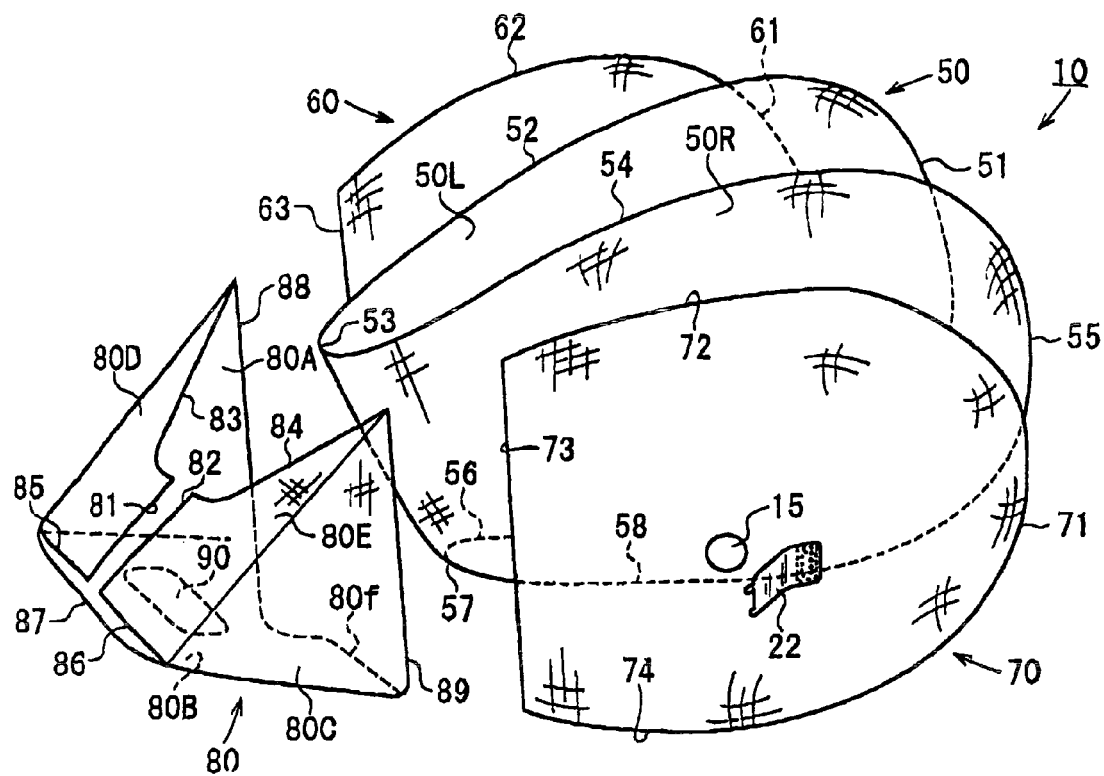
FIG. 3 is an exploded perspective view showing the structure of panels of the airbag in FIG. 1.
Figure 4:
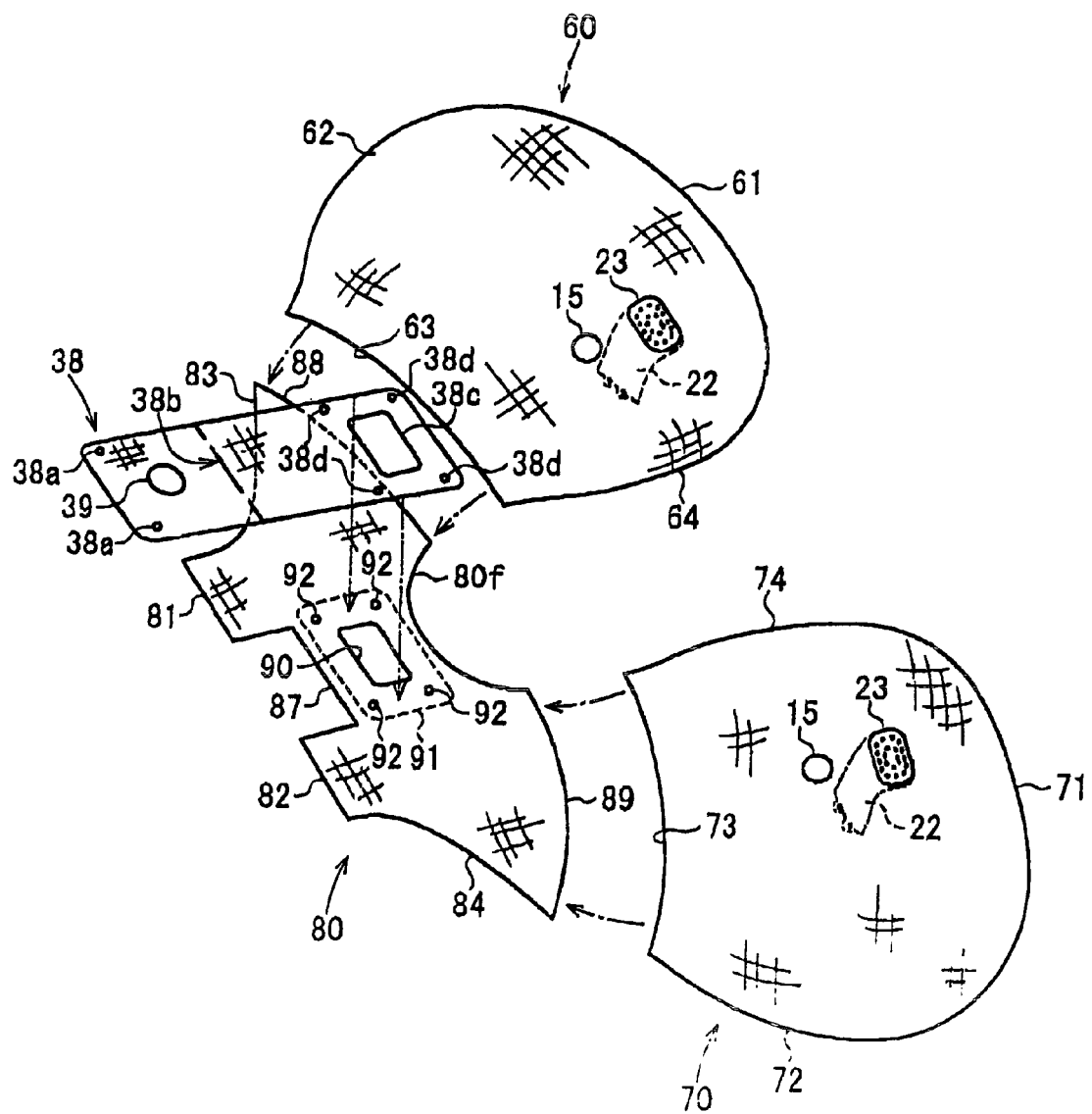
FIG. 4 is an exploded perspective view in the course of sewing the airbag in FIG. 1.
Figure 5:
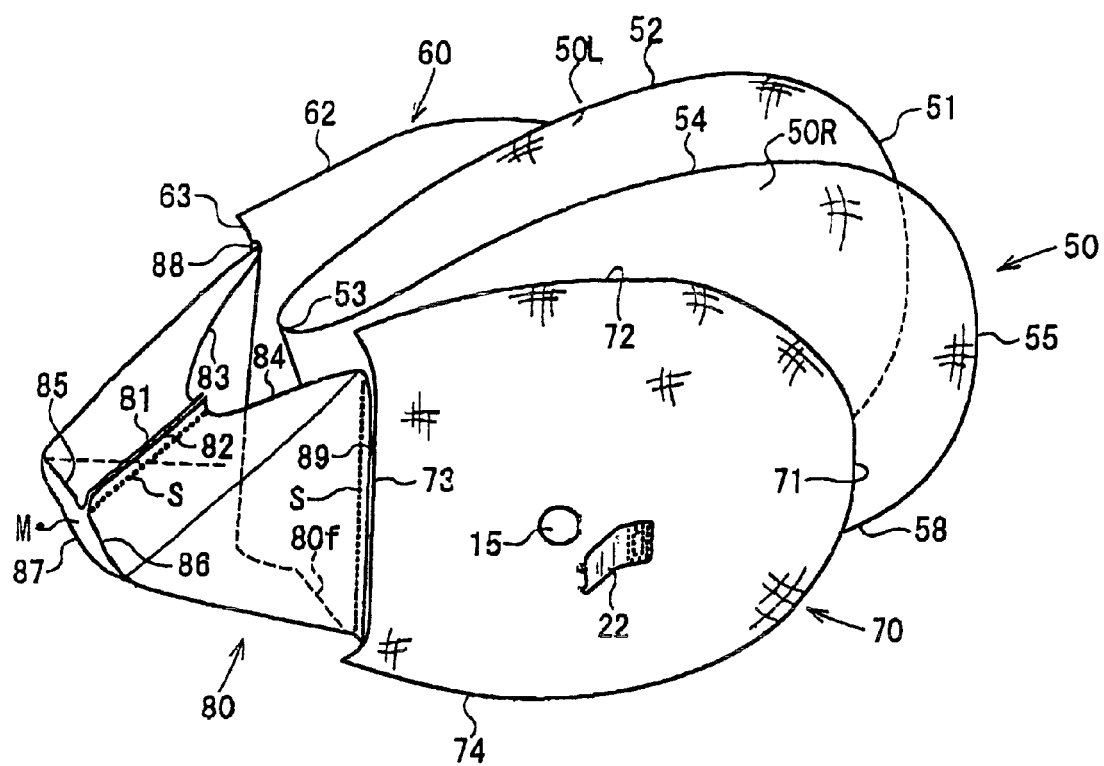
FIG. 5 is an exploded perspective view in the course of sewing the airbag in FIG. 1.
Figure 12:
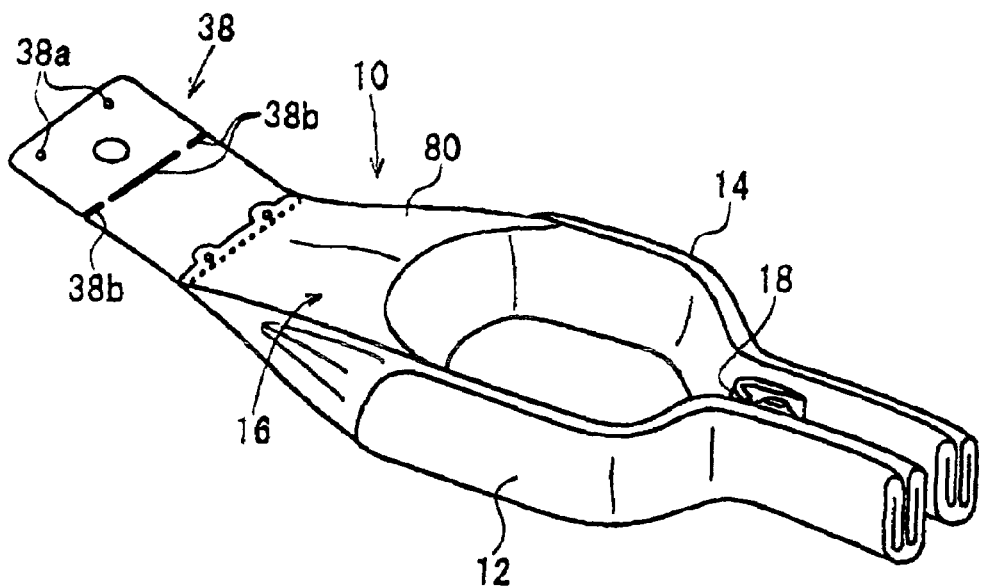
FIG. 12 is an explanatory view showing the process of folding the airbag in FIG. 1.
Figure 20:
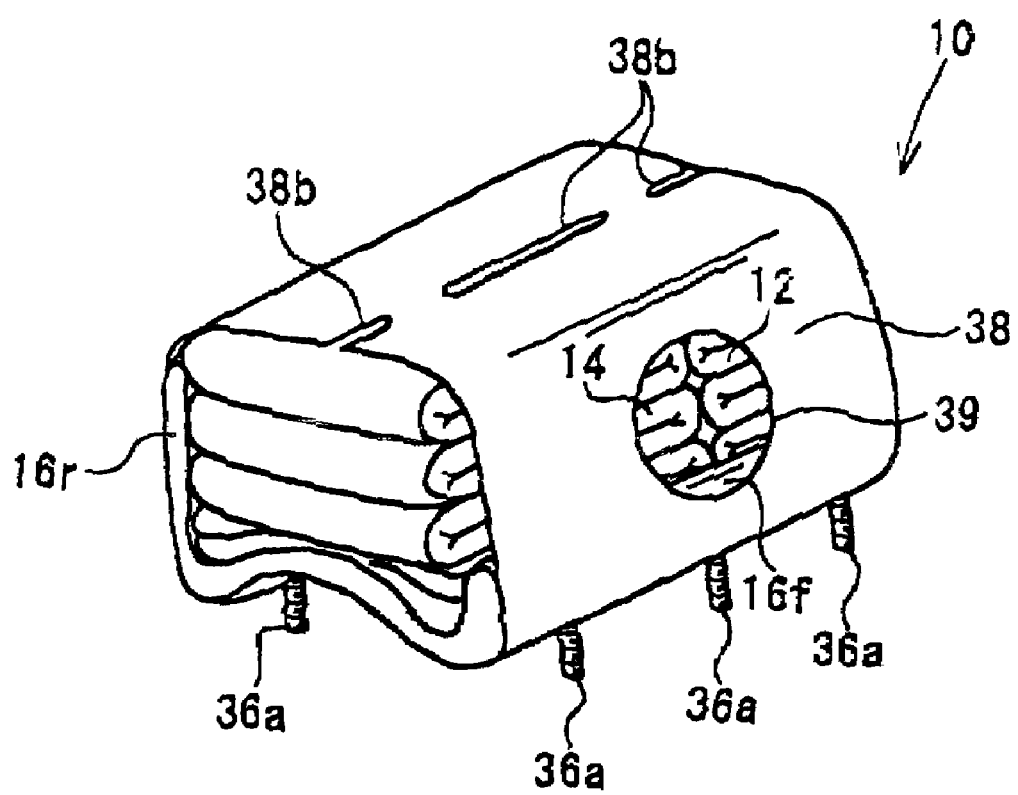
FIG. 20 is a perspective view showing a state in which the shape of the folded body of the airbag in FIG. 1 is retained by a shape-retaining sheet.
Figure 21:
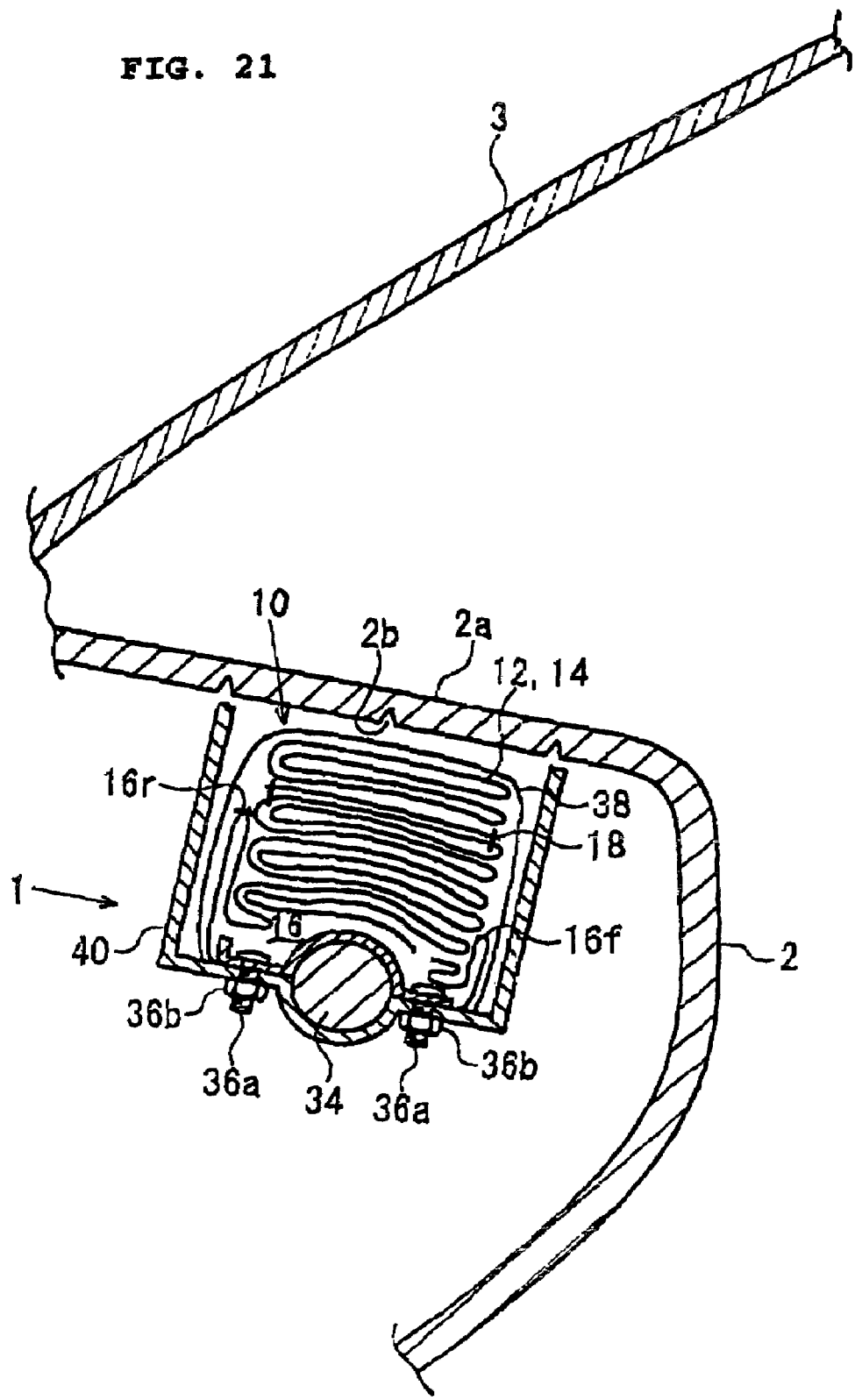
FIG. 21 is a longitudinal sectional view of an airbag device including the folded airbag in FIG. 1.
Figure 22:
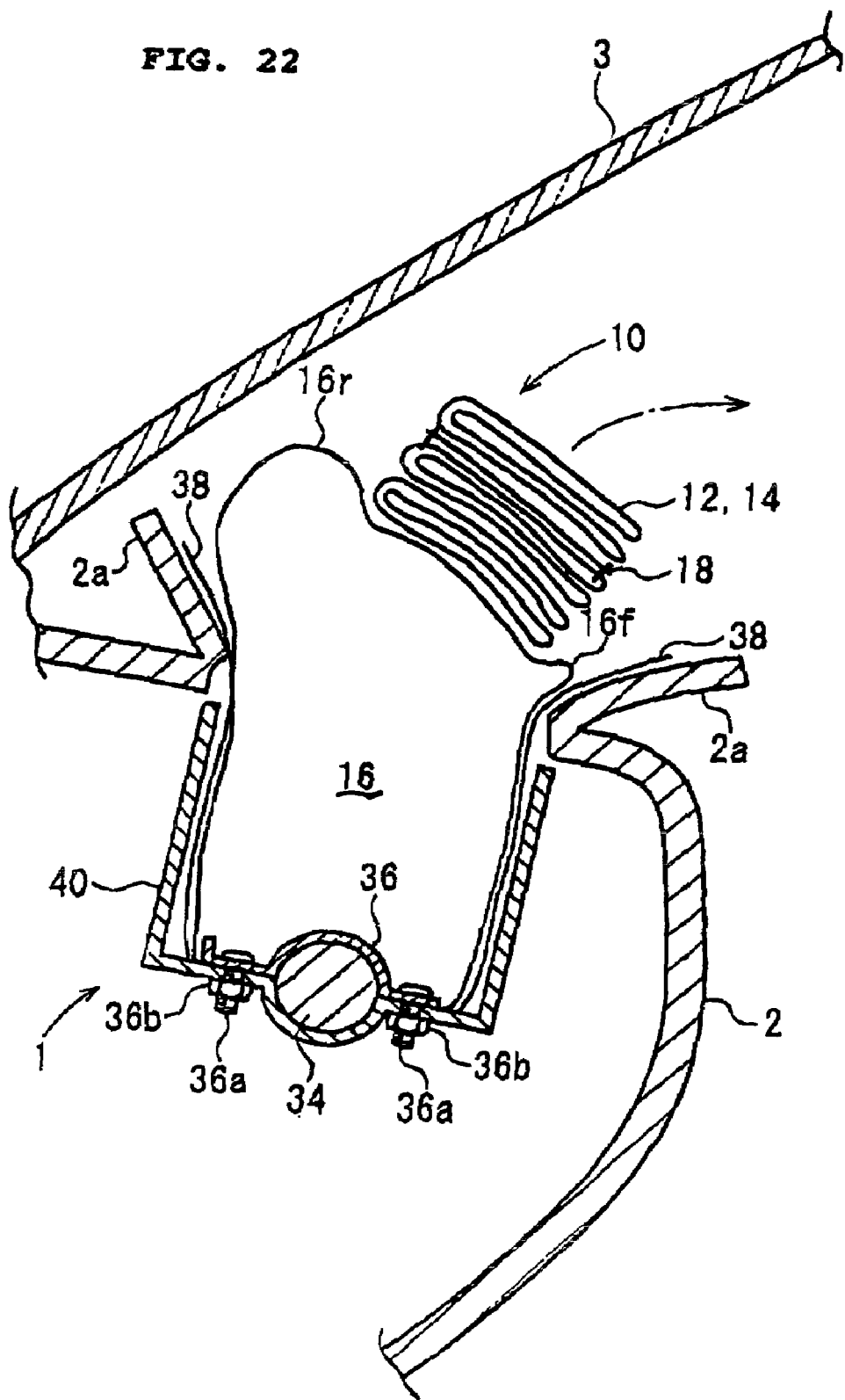
FIG. 22 is a longitudinal sectional view of the airbag of the airbag device in FIG. 11 when being inflated.

FIG. 1 is a perspective view of an airbag according to an embodiment of the invention. FIG. 2 is a horizontal sectional view of the airbag. FIG. 3 is an exploded perspective view showing the structure of panels of the airbag. FIGS. 4 and 5 are exploded perspective views in the course of sewing of the airbag. FIGS. 6 to 19 are explanatory views showing the process of folding the airbag. FIG. 20 is a perspective view of a shape-retained folded body of the airbag viewed from a passenger side. FIG. 21 is a longitudinal sectional view of an airbag device including the folded airbag. FIG. 22 is a longitudinal sectional view of the airbag device when the airbag is being inflated.

Figure 19A:
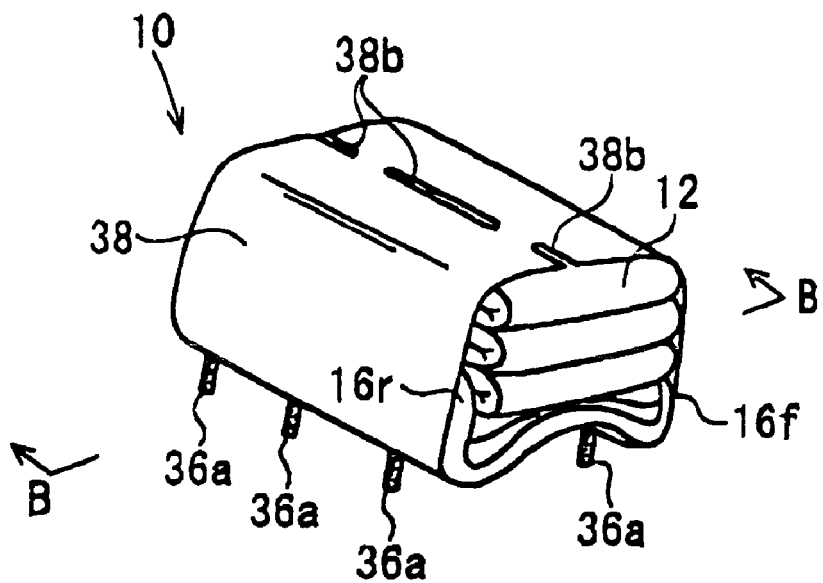
FIGS. 19(a) and 19(b) are explanatory views showing the process of folding the airbag in FIG. 1.
Figure 19B:
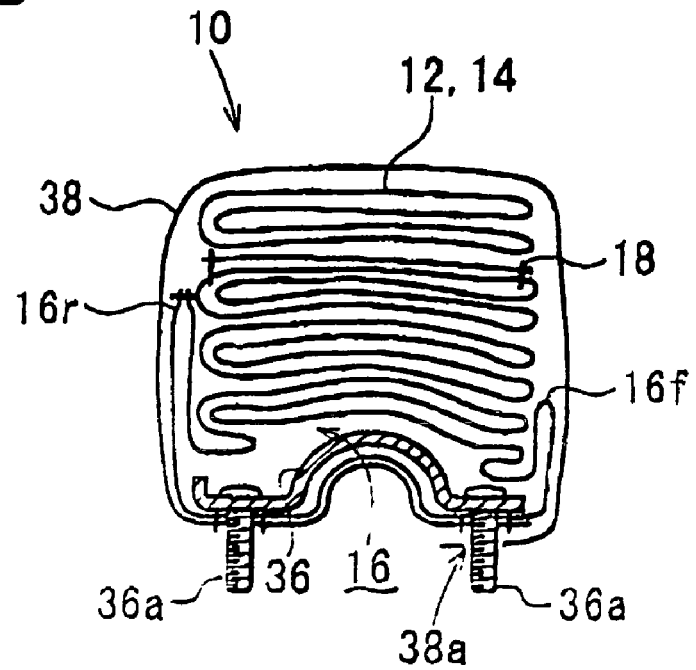

FIGS. 6(a) and 6(b) show a state of the airbag before being folded, FIGS. 7(a) to 18(b) show states of the airbag while being folded, and FIGS. 19(a) and (b) show a state of the airbag when being completely folded. In FIGS. 6(a) to 11(b), FIGS. 6(a), 7(a), 8(a), 9(a), 10(a) and 11(a) are side views of the airbag, and FIGS. 6(b), 7(b), 8(b), 9(b), 10(b) and 11(b) are sectional views taken along the lines B-B in FIGS. 6(a), 7(a), 8(a), 9(a), 10(a) and 11(a). FIGS. 12 to 14 and 15(a) are perspective views as seen from the leading side of the airbag (passenger side), and FIG. 15(b) and FIGS. 16(a), 17(a), 18(a) and 19(a) are perspective views as seen from the base end (rear end) of the airbag. FIGS. 16(b), 17(b), 18(b) and 19(b) are sectional views taken along the lines B-B of FIGS. 16(a), 17(a), 18(a) and 19(a).

In this embodiment, an airbag device 1 is a front passenger airbag device of an automobile. The airbag device 1 includes an airbag 10, a shape-retaining sheet 38 that retains the shape of a folded body of the airbag 10, a case (container) 40 that accommodates the folded airbag 10, and an inflator 34 that inflates the airbag 10.

An airbag 10 includes a left airbag section 12 that is inflated on the front left side of a passenger, a right airbag section 14 that is inflated on the front right side of the passenger, and a base chamber 16 that communicates one end of the left airbag section 12 with one end of the right airbag section 14. The base chamber 16 is the base side of the airbag 10. Accordingly, the left airbag section 12 and the right airbag section 14 are respectively inflated in a direction away from the base chamber 16.

When the airbag 10 is inflated, a space 13 (FIG. 2) is formed between a front most end of the left bag 12 and a front most end of the right bag 14 without a bridging member such as a tie panel therebetween. The space 13 is opened toward the passenger (toward the upper side in FIG. 2).

When the airbag 10 is completely inflated, it is preferable that the spacing between a front most end of the left airbag section 12 and a front most end of the right airbag section 14 be 150 to 450 mm, particularly, 170 to 430 mm.

It is also preferable that the horizontal distance from one of the front most ends to a deepest portion of the space 13 be 280 to 480 mm, particularly, 310 to 450 mm. In a middle portion between the front most end to the deepest portion, the airbag sections 12 and 14 are connected to each other by a connecting band 18. In this embodiment, the connecting band 18 comprises a left half of connecting band 18L and a right half of connecting band 18R.

The outer faces of the left and right airbag sections 12 and 14 are provided with vent holes 15. Width-regulating tethers 20L and 20R that extend in the right-and-left direction are stretched within the airbag sections 12 and 14, respectively. The structure of the tethers 20L and 20R will be described later.

In this embodiment, the shape-retaining sheet 38 for wrapping a folded body of the airbag 10 is connected to a rear end of the base chamber 16. The shape-retaining sheet 38 in this embodiment is a band-like sheet that extends rearwardly from the rear end of the base chamber 16. A portion of the shape-retaining chamber closer to the base end is sewn on the bottom face of the base chamber 16.

The shape-retaining sheet 38 wraps the folded body so as to go round from behind (the side opposite to a passenger) the folded body of the airbag 10 through above the top face of the folded body and the rear side (the passenger side) of the folded body into below the bottom face of the folded body.

Insertion holes 38a for the stud bolts 36a are bored in a portion of the shape-retaining sheet 38 in the vicinity of the leading end.

The shape-retaining sheet 38 is adapted to be ruptured when it receives a predetermined tension or more in its extending direction. Specifically, perforated slits 38b are formed in a middle portion of the shape-retaining sheet 38 in the extending direction of the sheet 38 so as to run in a direction intersecting the extending direction. When the shape-retaining sheet 38 receives a predetermined tension or more in the extending direction, it is torn and ruptured along the slits 38b.

The shape-retaining sheet 38 is provided with an opening 39 for allowing the state of the folded body wrapped by the shape-retaining sheet 38 to be observed. In this embodiment, the opening 39 is disposed in a region of the shape-retaining sheet 38 that overlaps the side of the folded body on the passenger side. In addition, the slits 38b extend so as to traverse a longitudinal intermediate portion of a region of the shape retaining sheet 38 that overlaps the top face of the folded body. The opening 39 is located in a middle portion between the slits 38b and the insertion holes 38a (in the vicinity of the leading end of the shape-retaining sheet 38).

The panel structure, etc. of the airbag 10 will be described below. In the following description, the front side (leading side) of each panel means the leading side of the airbag 10 in the inflation direction and the rear side means the base side of the airbag in the inflation direction.

The airbag 10 comprises a total of four panels, i.e., an inside panel 50, a left outside panel 60, a right outside panel 70, and a base panel 80. Each of the left and right halves of connecting band 18L and 18R is connected to the inside panel 50.

The inside panel 50 is substantially gourd-shape elongated panel. A left side 50L and a right side 50R are formed by folding the inside panel 50 into two in the middle thereof. In the inside panel 50, the left side 50L constitutes the inner face of the left airbag section 12, and the right side 50R constitutes the inner face of the right airbag section 14. The entire peripheral edge of the inside panel 50 comprises a lower edge 56, a leading edge 51 and an upper edge 52 of the left side 50L, an upper edge 53 which lies in the vicinity of a folded-back portion constituting the deepest portion between valleys of the airbag, an upper edge 54, a leading edge 55 and a lower edge 58 of the right side 50R, and a lower edge 57 which lies in the vicinity of the folded-back portion.

The entire peripheral edge of the left outside panel 60 comprises a leading edge 61, an upper edge 62, a straight rear edge 63, and a lower edge 64 (here, reference numeral 64 is not shown). The entire peripheral edge of the right outside panel 70 comprises a leading edge 71, an upper edge 72, a straight rear edge 73, and a lower edge 74.

The base panel 80 has a left lateral face 80A, a bottom face 80B, a right lateral face 80C, a left flap 80D constituting a top left side, a right flap 80E constituting a top right side. The base panel 80 is folded in such a manner that the lateral faces 80A and 80C form a substantially triangular shape. The face of the base panel 80 that faces the leading side of the airbag is opened.

The entire peripheral edge of the base panel 80 comprises facing edges 81 and 82 between substantially rectangular flaps 80D and 80E, front edges 83 and 84 (flap front edges) of the flaps 80D and 80E, rear edges 85 and 86 of the flaps 80D and 80E, a rear edge 87 facing the rear edges 85 and 86, front edges 88 and 89 (lateral front edges) of the lateral faces 80A and 80C, and a bottom front edge 80f that connects the lateral front edges 88 and 89 with each other.

As shown in FIG. 2, the bottom face 80B of the base panel 80 is provided with a gas introducing port 90. A frame-like reinforcing cloth 91 is overlapped with and sewn to the gas introducing port 90 so as to surround it. The gas introducing port 90 is rectangular, and has bolt insertion holes 92 formed in the vicinity of its four corners. Also, a peripheral edge of the gas introducing port 90 is provided with a locking hole (not shown) to which a pawl of a fixing plate 36, as will be described below, is to be locked.

In addition, as shown in FIG. 4, in this embodiment, a gas introducing port 38c, stud bolt insertion holes 38d, and a locking hole (not shown) are provided in a portion of the shape-retaining sheet 38 in the vicinity to the base end in a positional relation to overlap these.

In making the airbag 10, the rear edge 63 of the left outside panel 60 and the rear edge 73 of the right outside edge 70 are sewn to the lateral front edges 88 and 89, respectively, in a state where the base panel 80 is spread flat as shown in FIG. 4. Reference numeral S in FIG. 4 indicates sewing seams.

Further, the reinforcing cloth 91 is disposed on the peripheral edge of the gas introducing port 90 along an inner face (the face that becomes the inside of the airbag 10 when the airbag 10 becomes a finished product) of the bottom face 80B of the base panel 80. Also, the shape-retaining sheet 38 is overlapped with the outer face (the face that becomes the outside of the airbag 10 when the airbag 10 becomes a finished product) of the bottom face 80B such that the gas introducing ports 90 and 38c coincide with each other, the stud bolt insertion holes 92 and 38d coincide with each other, and the pawl locking holes coincide with each other. Then, the peripheral edges of the gas introducing ports 90 and 38c and the reinforcing cloth 91 are sewn together. In addition, the shape-retaining sheet 38, as shown in FIG. 4, takes such a posture that its leading end extends further rearwardly than the rear edge 87 of the base panel 80.

Next, the facing edges 81 and 82 of the flaps 80D and 80E of the base panel 80 are sewn together. This brings the panels 60, 70 and 80 into the state shown in FIG. 5. In FIG. 5, illustration of the shape-retaining sheet 38 is omitted.

Next, as shown in FIG. 5, the left outside panel 60 is caused to face the left side 50L of the inside panel 50, and the leading edges 51 and 61, the upper edges 52 and 62, and the lower edges 56 and 64 are sewn together, respectively. The right outside panel 70 is caused to face the right side 50R of the inside panel 50, and the leading edges 55 and 71, the upper edges 54 and 72, and the lower edges 58 and 74 are sewn together, respectively. Also, the flap front edges 83 and 84 of the base panel 80 are sewn to the upper edge 53 in the vicinity of the folded-back portion of the inside panel 50, and the bottom front edge 80f of the base panel 80 is sewn to the lower edge 57 in the vicinity of the folded-back portion.

In this embodiment, each of the width-regulating tethers 20L and 20R comprises a pair of tether halves 21 and 22. As shown in FIG. 2, the one tether half 21 has one end sewn on the inner face of the inside panel 50. In addition, in this embodiment, the one end of the tether half 21 and one end of the left or right halves of connecting band 18L or 18R are disposed in a positional relation to overlap each other with the inside panel 50 therebetween, and are sewn integrally with the inside panel 50. Therefore, the tether half 21 functions as a reinforcing cloth between the inside panel 50 and the left or right half of connecting band 18L or 18R, and the left or right half of connecting band 18L or 18R functions as a reinforcing cloth between the inside panel 50 and the tether half 21.

The other tether half 22 has one end sewn on the inner face of each of the outside panels 60 and 70. Reference numeral 23 represents reinforcing cloths that are disposed across the outside panels 60 and 70 from the one ends of the tether halves 22 and are sewn together therewith.

Next, the tether half 21 attached to the left side 50L and the other end of the tether half 22 attached to the left outside panel 60 are sewn together, and the tether half 21 attached to the right side 50R and the other end of the tether half 22 attached to the right outside panel 70 are sewn together.

By sewing the other ends of the tether halves 21 and 22 together, the left side 50L and the left outside panel 60 are connected to each other by the tether 20L, and the right side 50R and the right outside panel 70 are connected to each other by the tether 20R, thereby regulating the width of the left airbag section 12 and the right airbag section 14 when they are inflated.

By thus sewing, the airbag 10 (shown in FIG. 1) becomes to be an inside-out state, that is, to expose a sewing thread to the surface of the airbag. As shown in FIG. 5, the flap rear edges 85 and 86 and the rear edge 87 of the base panel 80 are not yet sewn together, but they form an opening M in this state.

Consequently, the airbag is inverted through the opening M. Next, the opening M is sewn and the left and right halves of connecting band 18L and 18R are sewn together, resulting in the airbag 10 in FIG. 1.

In this embodiment, an inflator 34 is disposed within the base chamber 16 through the gas introducing ports 38c and 90 at the bottom of the base chamber 16. In this embodiment, the inflator 34 is rod-shaped, and disposed such that the longitudinal direction is the width direction (the right-and-left direction) of a vehicle. Reference numeral 36 represents a fixing plate as a fixture to fix the bottom face of the base chamber 16 and the inflator 34 to an airbag mounting face of the accommodating case 40 (the bottom face of an accommodating case 40 in this embodiment).

As shown in FIG. 1 and FIGS. 16(b), 17(b), 18(b) and 19(b), the fixing plate 36 has C-shaped bands (reference numerals are omitted) fitted on peripheral sides of the inflator 34 at the longitudinal opposite ends, flanges (reference numerals are omitted) that extend along the bottom face of the base chamber 16 (and the airbag mounting face of the case 40) from both ends of the C-shaped bands, and stud bolts 36a protruding downwardly from the flanges, respectively. In addition, each flange is provided with a pawl (reference numeral is omitted) to lock the fixing plate 36 to the bottom face of the base chamber 16.

Prior to folding of the airbag 10 that has been completely sewn, the fixing plate 36 is introduced into the base chamber 16 from the gas introducing ports 38c and 90, and attached to the bottom face of the base chamber 16. At this time, the flanges of the fixing plate overlap peripheral edges of the gas introducing port 90 while the stud bolts 36a are inserted into the insertion holes 92, 38d, respectively, and the pawl of the flanges are hooked to the locking holes, respectively, thereby fixing the fixing plate 36. The stud bolts 36a extend to the outside of the airbag 10 through the insertion holes 92, 38d.

By fastening the fixing plate 36 to the airbag mounting face of the case 40 with the stud bolts 36a, the bottom face of the base chamber 16 and the inflator 34 are fixed to the airbag mounting face. Reference numeral 36b in FIGS. 21 and 22 represent nuts fitted around the stud bolts 36a, respectively.

Next, the process of folding the airbag 10 will be described with reference to FIGS. 6(a) to 19(b).

In folding the airbag 10, first, the left airbag section 12 and the right airbag section 14 are spread flat such that their respective left and right lateral faces (the left side 50L and the left outside panel 60 or the right side 50R and the right outside panel 70) overlap each other. Then, as shown in FIGS. 6(a) to 12, the left airbag section 12 and the right airbag section 14 are respectively folded so as to have a reduced vertical width, resulting in primary folded bodies that are elongated in forward and rearward directions.

In the primary folded bodies, in this embodiment, first as shown in FIGS. 6(a), 6(b), 7(a), and 7(b), a portion of the left airbag section 12 (lower airbag section) that is lower than the connecting band 18 (the connecting band between the left airbag section 12 and the right airbag section 14) is folded back upwardly along a folding line $L_1$ that connects a lower edge of the connecting band 18 and a lower edge of the fixing plate 36 at the front end, and is overlapped with the left outside panel 60.

Next, as shown in FIGS. 7(a), 7(b), 8(a), and 8(b), a portion closer to the lower edge 12b than the folding line $L_2$ is folded back downwardly along a folding line $L_2$ that extends parallel to the folding line $L_1$ with a predetermined spacing on the lower edge 12b side (on the upper side) of the folding line $L_1$ so that the portion is overlapped with the outside (the side opposite to the remaining right airbag section 14). At this time, the position of the folding line $L_2$ is determined, for example, by placing a ruler or a plate, etc. having a predetermined width along the folding line $L_1$. Similar to this, the following folding lines $L_3$ to $L_7$ are also determined by placing a ruler or a plate, etc. having a predetermined width along a previous folding line.

Next, as shown in FIGS. 8(a), 8(b), 9(a), and 9(b), the portion that protrudes downwardly from the folding line $L_1$ is folded back upwardly after the second folding. At this time, a portion closer to the lower edge 12b than the folding line $L_3$ is folded back upwardly so as to be overlapped with the outside along a folding line $L_3$ that extends parallel to the folding line $L_2$ with a predetermined spacing (in this embodiment, the spacing that is narrower than the spacing between the folding line $L_2$ and the folding line $L_1$) on the lower edge 12b side (on the lower side) of the folding line $L_2$.

Next, as shown in FIGS. 9(a) to 10(b), a portion of the left airbag section 12 (an upper airbag section) closer to an upper edge 12t than the connecting band 18 is folded back toward the left outside panel 60 sequentially along folding lines $L_4$, $L_5$, . . . , (only folding lines up to $L_7$ are shown in FIGS. 9(a) and 9(b)) that extend parallel to the folding line $L_1$ by a predetermined width downwardly from the upper edge 12t, resulting in an elongated folded roll. In this embodiment, the spacing of the folding lines $L_4$ to $L_7$ is set such that, when the upper folded roll reaches a portion near an upper portion of the lower folded body as shown in FIGS. 10(a) and 10(b), its vertical width becomes approximately equal to the vertical width of the lower folded body.

Thereafter, as shown in FIGS. 10(a), 10(b), 11(a), and 11(b), the upper folded roll is folded back downwardly along a line $L_8$, that is located between the folded roll and the lower folded body and extends parallel to the line $L_1$, so as to be overlapped with the outside of the lower folded body.

In addition, the roll folding may be performed, for example, by winding the upper airbag section around a predetermined width of a band-like plate from the upper edge 12t. In this case, the upper airbag section may be wound around a band-like plate and roll-folded. The resulting folded roll may be overlapped with the outside of the lower folded body. The band-like plate may be then pulled out of the folded roll. Thus, the folding work of the upper airbag section can be efficiently performed.

The right airbag section 14 is also primarily folded through the process similar to the left airbag section 12. FIGS. 11(a) and 11(b) shows that the primary folding of the left airbag section 12 and the right airbag section 14 has been completed. In addition, in FIGS. 6(a) to 11(b), reference numerals 14b and 14t represent a lower edge and an upper edge, respectively, of the right airbag section 14.

As such, when the left airbag section 12 and the right airbag section 14 are primarily folded, a first folding is performed along the folding line $L_1$ which connects the lower edge of the connecting band 18 with the lower edge of the fixing plate 38 at its front end when the left airbag section 12 and the right airbag section 14 are primarily folded, the position of the first fold is determined to be uniform. Also, the folding of the primary folding after the first folding can be performed parallel to the first folding line $L_1$ on the basis of the first folding line.

Figure 13:
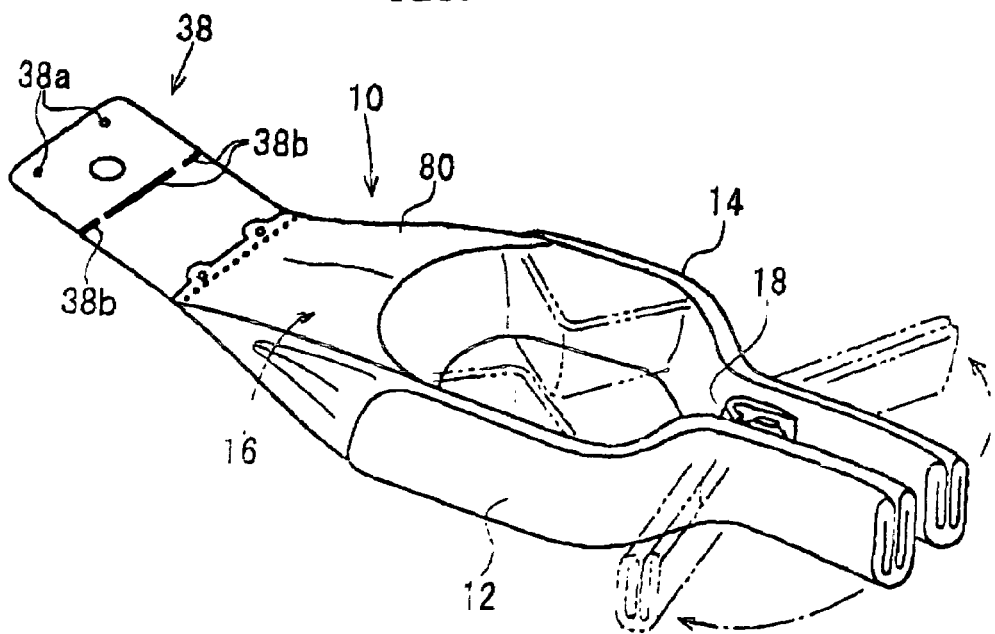
FIG. 13 is an explanatory view showing the process of folding the airbag in FIG. 1.
Figure 14:
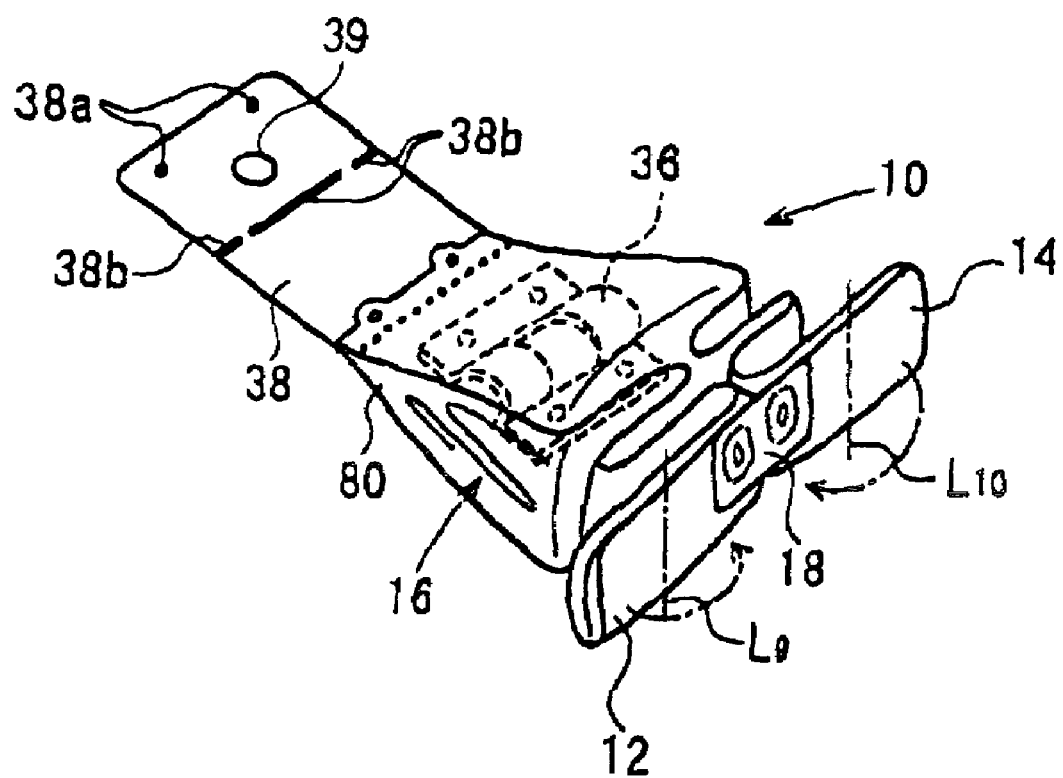
FIG. 14 is an explanatory view showing the process of folding the airbag in FIG. 1.
Figure 15A:
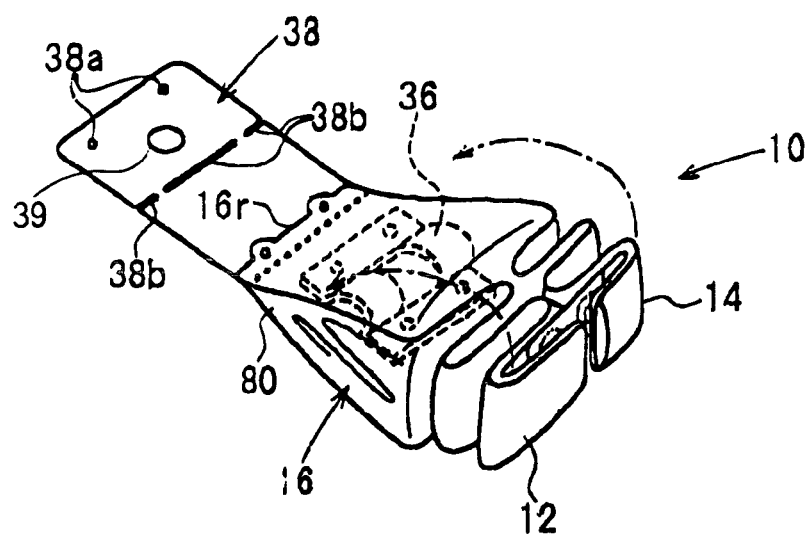
FIGS. 15(a) and 15(b) are explanatory views showing the process of folding the airbag in FIG. 1.
Figure 15B:
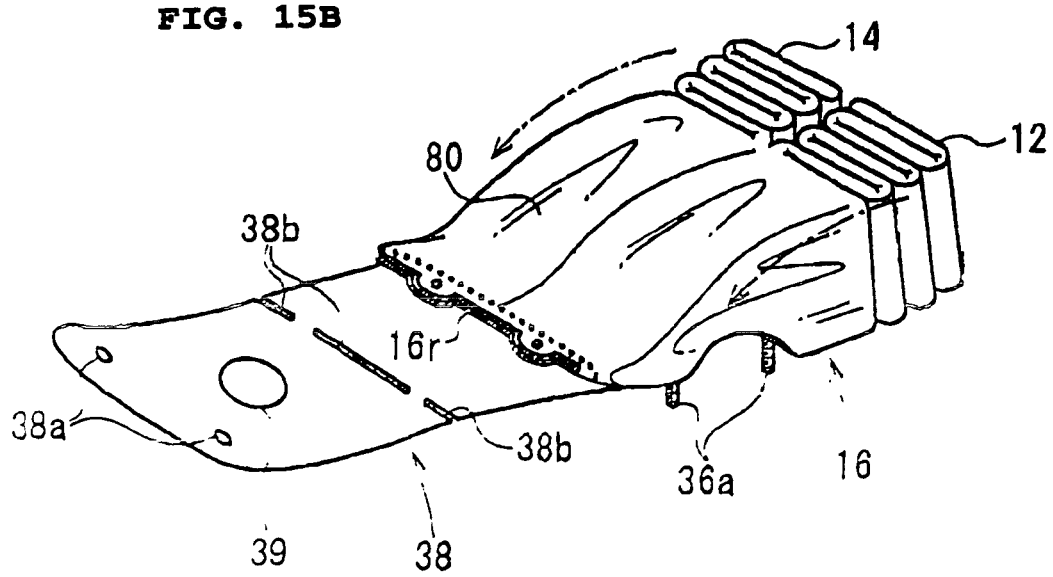

Next, as shown in FIGS. 13 and 14, in the primary folded bodies of the left airbag section 12 and the right airbag section 14 that are long in forward and rearward directions, portions closer to the leading ends of the primary folded bodies than the connecting band 18 are separated from each other to the right and left in the shape of open legs, and portions closer to rear ends of the primary folded bodies than the connecting band 18 are folded in an accordion fashion (in a zigzag fashion) so as to have a reduced longitudinal width. Next, as shown in FIGS. 14, 15(a), and 15(b), the portions of the airbag sections 12 and 14 closer to the leading ends than the connecting band 18 are folded back to the front of the connecting band 18 along the vertical folding lines $L_9$ and $L_{10}$, respectively, that are located in the middle of the portions closer to the leading ends. As a result, a secondary folded body shown in FIG. 14 is formed.

The primary folding method and the secondary folding method of the left airbag section 12 and the right airbag section 14 are not limited to the above description.

Figure 16A:
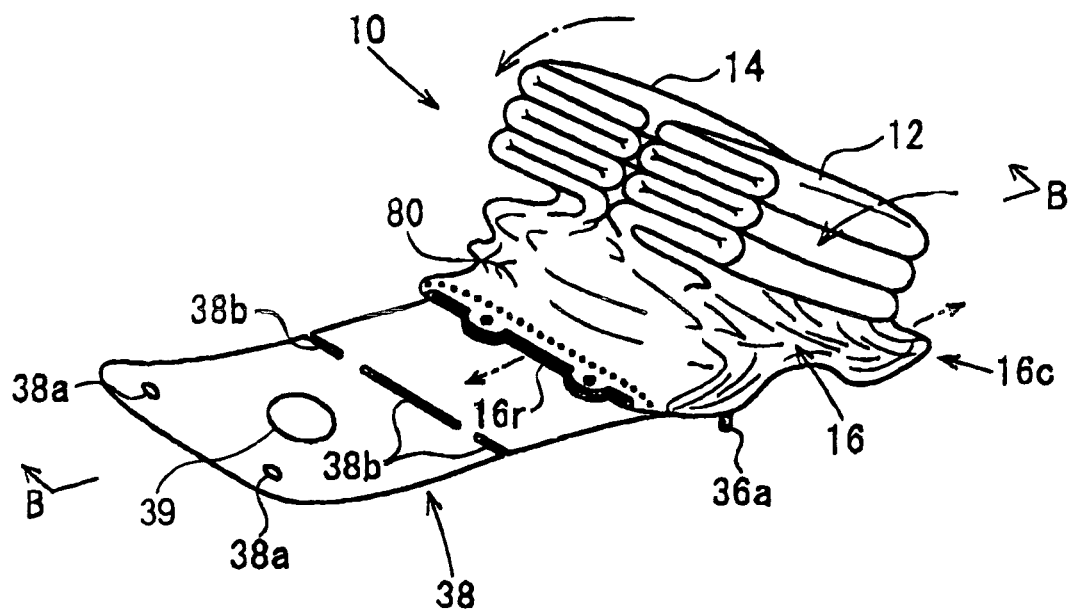
FIGS. 16(a) and 16(b) are explanatory views showing the process of folding the airbag in FIG. 1.
Figure 16B:
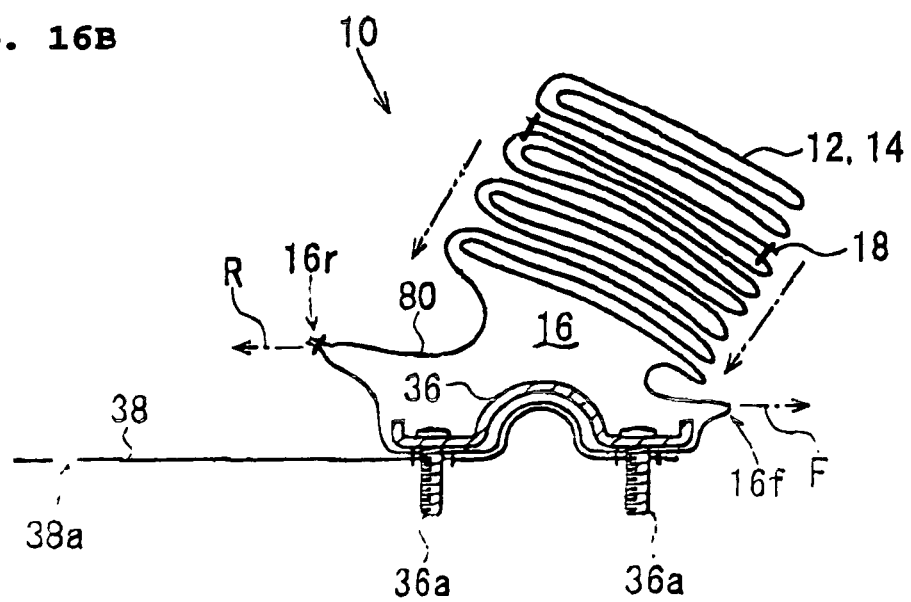
Figure 17A:
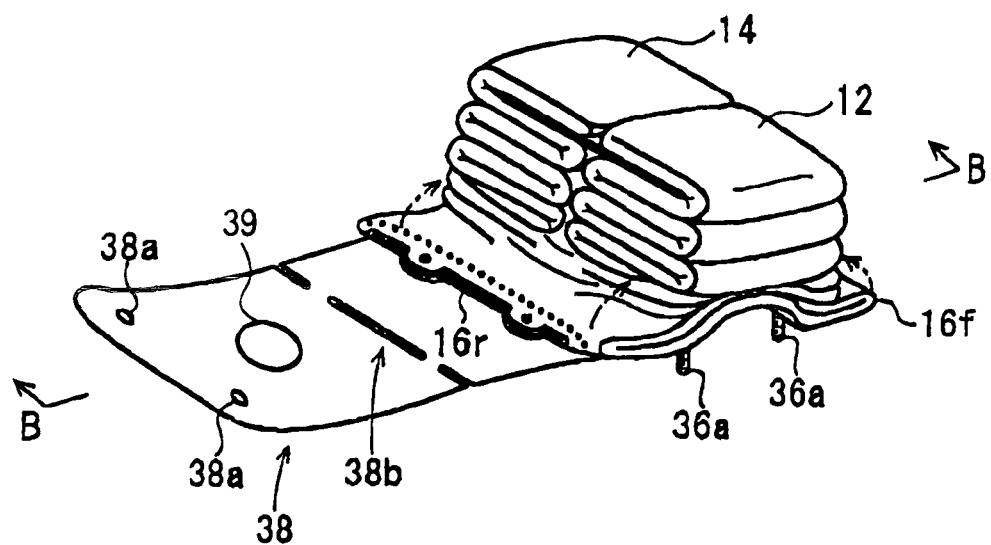
FIGS. 17(a) and 17(b) are explanatory views showing the process of folding the airbag in FIG. 1.
Figure 17B:
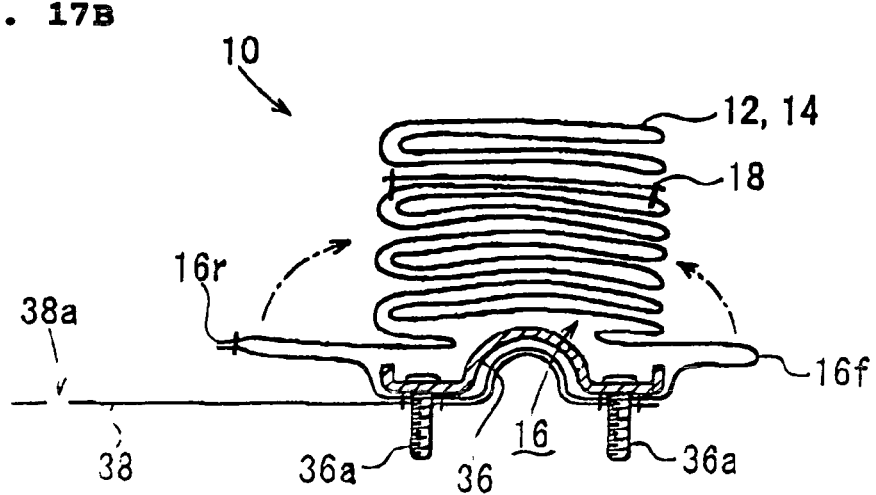
Figure 18A:
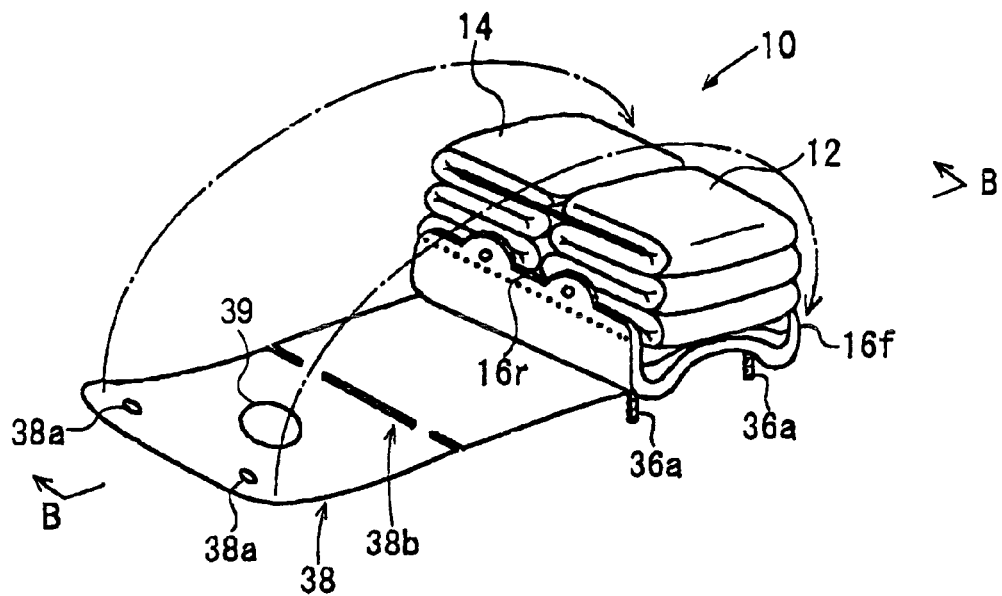
FIGS. 18(a) and 18(b) are explanatory views showing the process of folding the airbag in FIG. 1.
Figure 18B:
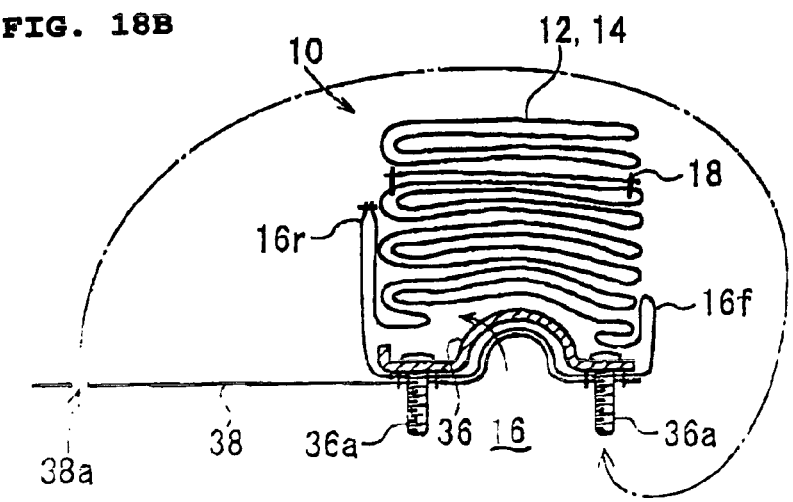

Next, as shown in FIGS. 15(a) to 17(b), the base panel 80 is flattened so that the base chamber 16 becomes a so-called "beaten state," and the secondary folded body of the left airbag section 12 and the right airbag section 14 is placed on the flattened base panel. As a result, as shown in FIG. 17(b), the base chamber 16 and the secondary folded body overlap the fixing plate 36. FIGS. 15(a) and 15(b) show a state of the base panel 80 before being flattened, FIGS. 16(a) and 16(b) show a state of the base panel 80 while being flattened, and FIGS. 17(a) and 17(b) show a state of the base panel after being flattened.

When the base panel 80 is flattened, as shown in FIG. 16(b), the portion between the front edges 83 and 84 of the flaps 80D and 80E and a rear edge of the gas introducing port 90 of the base panel 80 are loosened. As indicated by the arrow R in FIG. 16(b), a rear end 16r of the base chamber 16 is pulled rearwardly, and the base chamber 16 is pulled out rearwardly by the loosened distance.

When the rear end 16r is pulled rearwardly, the base panel 80 remains loosened between the rear end 16r and the flap front edges 83 and 84 (flaps 80D and 80E) even if a portion between the rear end 16r and the rear edge of the gas introducing port 90 is stretched without looseness. Consequently, in this embodiment, as shown in FIG. 17(b), the middle portions of the flaps 80D and 80E are introduced into the space below the secondary folded body by the loosened distance so that the portion pulled out rearwardly of the secondary folded body extends flatly. Except for this operation, the flaps 80D and 80E may be folded in a zigzag pattern and overlapped with the rear end 16r, for example, by chucking out the middle portions of the straps 80D and 80E rearwardly by the loosened distance.

In addition, since looseness is also caused in the portion between the bottom front edge 80f and the front edge of the gas introducing port 90 of the base chamber 16, the base chamber 16 is also pulled out forwardly by pulling a front end 16f of the base chamber 16 forward as indicated by the arrow F. In this case, since the length of the base panel 80 from the rear edge of the gas introducing port 90 to the flap front edges 83 and 84 is larger than the length of the base panel 80 from the front edge of the gas introducing port 90 to the bottom front edge 80f, the length of the base chamber 16 that is pulled out rearwardly (in the R-direction) becomes larger than the length of the base chamber 16 that is pulled out forward (in the F-direction). It should be noted herein that pull-out of the front end 16f toward a passenger may be omitted.

When the base panel 80 is flattened, looseness is also caused in the left lateral face 80A and the right lateral face 80C of the panel 80. In this embodiment, the left lateral face 80A and the right lateral face 80C are respectively folded into the space below the secondary folded body.

Thereafter, the pulled-out portions of the base chamber 16 closer to the rear end 16r and the front end 16f are respectively folded back upwardly and overlapped with the rear side (the side opposite to a passenger) and the front side (the passenger side) of the secondary folded body. In addition, as shown in FIGS. 18(a) to 20, the pulled-out portion of the base chamber closer to the rear end 16r covers the rear lateral face of the secondary folded body from its lower end to a portion in the vicinity of its upper end, and the pulled-out portion of the base chamber closer to the front end 16f covers only the portions in the vicinity of the lower ends of the front lateral face of the secondary folded body.

Thereafter, as shown in FIGS. 18(a), 18(b), 19(a), and 19(b), the shape-retaining sheet 38 is pulled forwardly around the folded body of the airbag 10 so as to cover the folded body from its rear side to the upper side. Then, the stud bolts 36a extending from the bottom of the base chamber 16 are inserted through the insertion holes 38a, respectively, of the shape-retaining sheet 38 at its leading end, and thereby the shape-retaining sheet 38 is caught by the stud bolts 36a. As a result, the folded body of the airbag 10 is wrapped (retained in shape) by the shape-retaining sheet 38, completing the folding of the airbag 10.

When the folded body of the airbag 10 is wrapped by the shape-retaining sheet 38 as such, the opening 39 provided in the shape-retaining sheet 38 is disposed so as to face the lateral face of the folded body on the passenger side. As a result, the folded state of the airbag 10 formed on the lateral face of the folded body on the passenger side can be observed with eyes or fingers through the opening 39. In addition, in this embodiment, the opening 39 is sized such that both the lateral face of the secondary folded body of the left airbag section 12 and the right airbag section 14 on the passenger side, and the leading end 16f of the base chamber 16 that is pulled out toward the passenger and overlapped below the lateral face of the secondary folded body on the passenger side can be observed.

As a result of observing the folded state of the airbag 10 through the opening 39, if it is proved that the airbag 10 is folded by an abnormal folding method or the folding is not maintained, the airbag 10 is refolded after the shape-retaining sheet 38 is removed, or measures such as rearranging the fold are taken. Thereafter, the folded body of the airbag 10 is rewrapped by the shape-retaining sheet 38. Alternatively, the folding of the folded body may be arranged by inserting an operator's finger into the opening 39.

The folded body of the airbag 10 along with the inflator 34 is accommodated within the case 40 and the accommodated airbag 10 is fixed to the airbag mounting face by nuts 36b and bolts 36a of the fixing plate 36, thereby forming an airbag device 1.

In the airbag device 1, since the folded body of the folded airbag 10 is wrapped by the shape-retaining sheet 38, the folded shape of the folded body is maintained. Therefore, when the folded body of the airbag 10 is accommodated within the case 40, the work can be efficiently performed.

Also, any slip between the folded body of the airbag 10 accommodated within the case 40 and the inner face of the case 40, the instrument panel 2, or a lid is eliminated or suppressed.

In this embodiment, the airbag device 1 is installed on the back of an instrument panel 2 in front of a front passenger seat. A portion of the instrument panel 2 that covers the case 40 serves as a door 2a that is pushed and torn open toward the interior of the vehicle by the airbag 10 when the airbag 10 is inflated. Reference numeral 2b in FIG. 21 represents a tear line that induces the tearing of the door 2a.

It should be noted herein that a lid (lid member) adapted to be pushed and torn open when the airbag 10 is inflated may be mounted on the case 40 and the instrument panel 2 may be provided with an opening for installation of the airbag device 1 so that, when the airbag device 1 is installed within the opening, the opening is covered with the lid.

As shown in FIG. 21, a windshield 3 exists above the instrument panel 2. The windshield rises upwardly while it is inclined rearwardly of the vehicle from an end of the instrument panel 2 on the front side of the vehicle.

If a vehicle equipped with the airbag device 1 encounters an emergency situation, the inflator 34 operates to discharge gas. As a result, gas is discharged into the base chamber 16 from the inflator 34. The gas from the inflator 34 flows into the left airbag section 12 and the right airbag section 14 from the base chamber 16. Then, this gas causes the left airbag section 12 and the right airbag section 14 to inflate on the left and right sides, respectively, in front of a passenger.

When the airbag 10 begins to be inflated, the shape-retaining sheet 38 is ruptured along the slits 38b due to the inflation pressure of the airbag 10, thereby releasing the folds of the airbag 10. Next, the base chamber 16 is inflated, which in turn pushes the secondary folded body of the left airbag section 12 and the right airbag section 14 out of the case 40 while pushing the door 2a of the inflator open.

In this embodiment, when the base chamber 16 is folded, the portion of the base chamber 16 closer to its rear end 16r is pulled out rearwardly and overlapped with the rear lateral face of the secondary folded body. Thus, when the base chamber 16 is inflated, as shown in FIG. 22, the rear end 16r swells greatly on the rear side (vehicle front side) of the secondary folded body. Thereby, the secondary folded body is pushed out by the inflated rear end 16r so that the left airbag section 12 and the right airbag section 14 are smoothly deployed toward the passenger.

In this embodiment, since the portion of the base chamber 16 closer to its front end 16f is also pulled out a bit forwardly, as shown in the drawing, the portion of the base member 16 closer to the front end 16f is inflated so as to support the secondary folded body on the front bottom of the secondary folded body.

Thereafter, the left airbag section 12 and the right airbag section 14 are inflated to the left and right, respectively, in front of a passenger, whereby the left airbag section 12 receives the left chest of a passenger and the right airbag section 14 receives the right chest of the passenger. Hard and strong ribs exist in the left and right chests. The left airbag section 12 and the right airbag section 14 receive and absorb an impact on the passenger through the ribs. Also, the space 13 exists between the leading ends of the inflated left and right airbag sections 12 and 14 so that the breastbones in the center of the passenger's chest faces the space 13. Thus, if the passenger's body rushes into the airbag 10, the breastbone region of the chest does not receive reaction force too much from the airbag 10. As a result, a burden on the breastbones becomes small.

In this embodiment, in a state in which the airbag 10 is inflated, the spacing between the front most ends of the left airbag section 12 and the right airbag section 14 is set to 150 to 450 mm. Thus, the inflated left airbag section 12 directly faces a central region of the left chest, and the inflated left airbag section 14 directly faces a central region of the right chest. As a result, the region of the ribs of the upper half of the passenger's body is reliably and securely received by the airbag 10.

The above embodiment is just an example, and the invention is not limited to the above embodiment.

For example, the opening of the shape-retaining sheet may have other shapes than those illustrated. In the above embodiment, the opening is provided so as to face the lateral face of the folded body of the airbag on the passenger side. However, an opening may be provided so as to face the lateral face of the folded body opposite to a passenger or the top face thereof. The shape-retaining sheet may be adapted to cover, including the above lateral faces, right and left lateral faces of the folded body. In this case, openings may be provided so as to face the right and left lateral faces of the folded body. A plurality of openings may be provided, or one opening may be provided so as to exist over a plurality of the lateral faces of the folded body.

Figure 23:
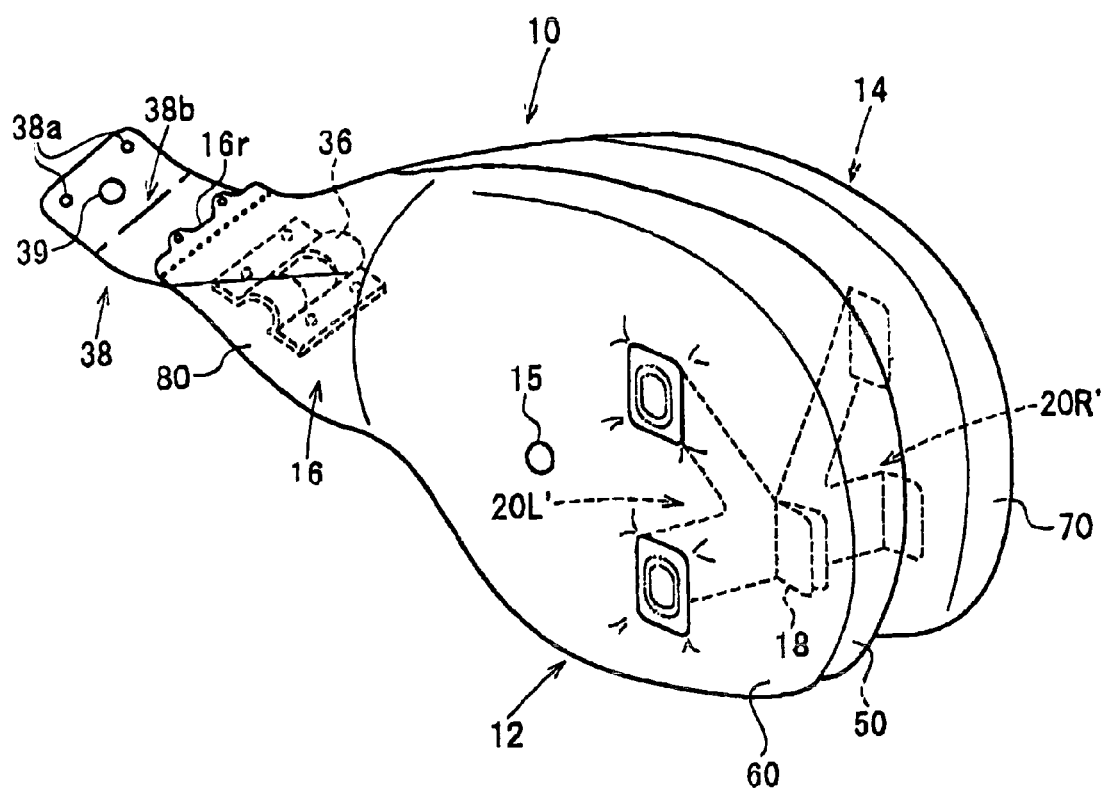
FIG. 23 is a perspective view of an airbag according to another embodiment.

The structure of the width-regulating tethers provided within the right and left airbag sections, respectively, is not limited to the above embodiment. For example, tethers such as width-regulating tethers 20L' and 20R' of an airbag 10' may be provided which extend in an oblique direction as shown in FIG. 23. It is natural that a plurality of width-regulating tethers may be provided, with their arrangement positions and extension directions being made different from each other.

The above embodiments illustrate applications of the invention for a front passenger airbag device of automobiles. However, the invention is naturally applicable not only to airbag devices for passengers other than the front passenger but also to airbag devices for receiving passengers of high-speed mobile objects other than the automobile.

What is claimed is:

1. An airbag for being deployed toward a vehicle occupant, the airbag comprising:
   a base airbag section;
   a first lateral airbag section connected to the base airbag section for being deployed along one side of the vehicle occupant;
   a second lateral airbag section connected to the base airbag section for being deployed along the other side of the vehicle occupant;
   a folded body including the first and second lateral airbag sections folded in a predetermined configuration;
   a shape-retaining panel connected to the base airbag section and being wrapped around the folded body to cover only an outer surface of the folded body; and
   at least one viewing opening in the shape-retaining panel for viewing the folded body, the opening being configured and arranged such that a portion of both the first and second lateral airbag sections of the folded body can be viewed through the viewing opening;
   wherein the base airbag section is substantially flattened with the folded body placed thereon and wherein a flap portion of the flattened base airbag section is pulled out therefrom to extend beyond a periphery of the overlying folded body adjacent thereto and folded so that at least a portion of the flap portion can be viewed through the at least one viewing opening.

2. The airbag of claim 1 wherein the base airbag section and the folded body have a predetermined orientation relative to the vehicle occupant and the shape-retaining panel is connected to the base airbag section at a side of the base airbag section arranged to be facing away from the vehicle occupant.

3. The airbag of claim 1 wherein the base airbag section and the folded body have a predetermined orientation relative to the vehicle occupant and the at least one viewing opening is arranged to be located on a portion of the shape-retaining panel covering at least one of:
- a lateral face of the folded body facing the vehicle occupant;
- a lateral face of the folded body facing away from the vehicle occupant;
- a lateral face of the folded body facing the first lateral airbag section;
- a lateral face of the folded body facing the second lateral airbag section;
- a top face of the folded body.

4. The airbag of claim 1 wherein the at least one viewing opening is generally of a circular shape.

5. The airbag of claim 1 wherein the shape-retaining panel includes a leading edge that extends from the base airbag section out from one side thereof to be wrapped around the folded body and under the opposite side of the base airbag section at which the leading edge is anchored.

6. The airbag device of claim 1 wherein the shape-retaining panel includes a plurality of side portions for covering the folded body and a plurality of corner portions between adjacent side portions and the viewing opening is located on the panel wrapped about the folded body so as to not intersect any of the plurality of corner portions thereof.

7. The airbag of claim 1 wherein the folded body includes a plurality of lateral faces and the viewing opening is located in the middle of one of the lateral faces so that at least a portion of both the first lateral airbag section and the second lateral airbag section can be viewed through the viewing opening.

8. An airbag for being deployed toward a vehicle occupant, the airbag comprising:
- a base airbag section;
- a first lateral airbag section connected to the base airbag section for being deployed along one side of the vehicle occupant;
- a second lateral airbag section connected to the base airbag section for being deployed along the other side of the vehicle occupant;
- a folded body including the first and second lateral airbag sections folded in a predetermined configuration;
- a shape-retaining panel connected to the base airbag section and being wrapped around the folded body to cover only an outer surface of the folded body; and
- at least one viewing opening in the shape-retaining panel for viewing the folded body, the opening being configured and arranged such that a portion of both the first and second lateral airbag sections of the folded body can be viewed through the viewing opening;
- wherein the base airbag section and the folded body have a predetermined configuration and orientation relative to the vehicle occupant and the shape retaining panel includes a plurality of side portions for covering the folded body including a first side portion that extends over a lateral face of the folded body opposite the vehicle occupant, a second side portion that extends over the top of the folded body toward the vehicle occupant, and a third side portion that extends down over a lateral face of the folded body facing the vehicle occupant.

9. The airbag of claim 8 wherein the opening is of a predetermined size such that the folded body can be manipulated through the at least one viewing opening.

10. The airbag of claim 8 wherein the shape-retaining panel includes slits for being ruptured upon airbag inflation, with the slits being distinct and spaced from the viewing opening.

11. The airbag of claim 10 wherein the slits are generally located in the middle of one of the side portions.

12. The airbag of claim 10 wherein the viewing opening is located in one of the side portions and the slits are located on one of the side portions not containing the viewing opening.

13. The airbag device of claim 10 wherein the viewing opening is larger than any one of the slits.

14. The airbag device of claim 10 wherein the viewing opening is wider than the slits.

15. The airbag of claim 8 wherein the viewing opening is located on the third side portion and the slits are located in the second side portion.

16. The airbag of claim 8 wherein the predetermined configuration of the folded body is generally cubical, including corners between the lateral faces thereof, and the viewing opening is located in one of the side portions spaced from the corners of the folded body.

17. The airbag of claim 8 wherein the shape-retaining panel further includes a fourth side portion that extends over a lateral face of the folded body facing the first lateral airbag section and a fifth side portion that extends over a lateral face of the folded body facing the second lateral airbag section.

* * * * *